(12) United States Patent
Okuda

(10) Patent No.: US 8,570,917 B2
(45) Date of Patent: Oct. 29, 2013

(54) RELAY STATION, RECEIVING STATION, TRANSMITTING STATION, AND PACKET COMMUNICATION SYSTEM

(75) Inventor: Masato Okuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 67 days.

(21) Appl. No.: 13/328,247

(22) Filed: Dec. 16, 2011

(65) Prior Publication Data

US 2012/0093068 A1    Apr. 19, 2012

Related U.S. Application Data

(63) Continuation of application No. PCT/JP2009/004000, filed on Aug. 20, 2009.

(51) Int. Cl.
*H04B 3/36* (2006.01)
*H04J 3/08* (2006.01)

(52) U.S. Cl.
USPC .................................... 370/293; 370/315

(58) Field of Classification Search
USPC ......... 370/282, 293, 315, 328, 338, 394, 401, 370/474
See application file for complete search history.

(56) References Cited

U.S. PATENT DOCUMENTS

| | | | | |
|---|---|---|---|---|
| 7,570,645 | B2 * | 8/2009 | Agarwal | 370/395.1 |
| 7,817,552 | B2 * | 10/2010 | Miyake et al. | 370/235 |
| 7,957,430 | B2 * | 6/2011 | Kashima et al. | 370/470 |
| 7,991,352 | B2 * | 8/2011 | Suh et al. | 455/8 |
| 8,155,053 | B2 * | 4/2012 | Wang et al. | 370/328 |
| 2002/0036986 | A1 * | 3/2002 | Haarsten | 370/235 |
| 2008/0043619 | A1 * | 2/2008 | Sammour et al. | 370/231 |
| 2008/0151897 | A1 * | 6/2008 | Nemoto et al. | 370/392 |
| 2009/0245166 | A1 | 10/2009 | Okuda | |

FOREIGN PATENT DOCUMENTS

| | | |
|---|---|---|
| EP | 2 096 803 | 9/2009 |
| JP | 08-502159 | 3/1996 |
| JP | 2001-036586 | 2/2001 |
| JP | 2007-529182 | 10/2007 |
| JP | 2009-044694 | 2/2009 |
| WO | 95/04421 | 2/1995 |
| WO | 2005/094018 | 10/2005 |

(Continued)

OTHER PUBLICATIONS

English translation of the International Search Report issued for corresponding International Patent Application No. PCT/JP2009/004000, dated Nov. 9, 2009.

(Continued)

*Primary Examiner* — Hong Cho
(74) *Attorney, Agent, or Firm* — Myers Wolin, LLC

(57) ABSTRACT

A relay station relays packets between a transmitting station and a receiving station, and when a transmission packet affixed with a packet number is received, the relay station generates a divided data unit by dividing the data included in the transmission packet, then generates a divided packet including the divided data unit affixed with the packet number and dividing position information indicating the dividing position of the divided data unit, and transmits the divided packet to the receiving station. Alternatively, the relay station generates a divided data unit by dividing the data in the received transmission packet, then generates a divided packet including the divided data unit affixed with a new packet number, and transmits the divided packet to the receiving station. An ARQ process is executed using the dividing position information or the new packet number included in the divided packet.

11 Claims, 17 Drawing Sheets

(56) References Cited

FOREIGN PATENT DOCUMENTS

| WO | 2008/030050 | 3/2008 |
|---|---|---|
| WO | 2008/078365 | 7/2008 |
| WO | 2008078365 | 7/2008 |

OTHER PUBLICATIONS

Anil Agiwal, Samsung India Software Operations, MAC SDU Fragmentation & Packing scheme for 16m, Document No. C80206m-09_0393, Feb. 27, 2009. Referenced in the International Search Report for corresponding International Patent Application No. PCT/JP2009/004000.

IEEE Std. 802.16TM-2009, Part 16: Air Interface for Broadband Wireless Access Systems, May 29, 2009.
IEEE Std. 802.16jTM-2009, Part 16: Air Interface for Broadband Wireless Access System, Amendment 1: Multihop Relay Specification, Jun. 12, 2009.
The extended European search report includes the supplementary European search report and the European search opinion issued for corresponding European Patent Application No. 09848450.4., dated Dec. 20, 2012.
Can et al.; "MAC-PDU Size Optimization for OFDMA Modulated Wireless Relay Networks"; Global Telecommunications Conference; IEEE Globecom 2008; Nov. 30, 2008; pp. 1-6.
Office Action issued for corresponding Japanese Patent Application No. 2011-527488, dated Jun. 4, 2013, with English translation.

* cited by examiner

| Original Packet No. SN | New Packet No. SN |
|---|---|
| 6 | 31, 32 |
| 7 | 33 |
| 8 | 34, 35, 36 |
| ⋮ | ⋮ |

RELAY STATION, RECEIVING STATION, TRANSMITTING STATION, AND PACKET COMMUNICATION SYSTEM

This application is a continuation application of International Application PCT/JP2009/004000, filed on Aug. 20, 2009, now pending, the contents of which are herein wholly incorporated by reference.

FIELD

The present invention relates to relay stations for relaying transmission packets between a transmitting station and a receiving station, receiving stations for receiving, via a relay station, data of transmission packets transmitted from a transmitting station, transmitting stations for transmitting data of transmission packets to a receiving station via a relay station, and packet communication systems in which a relay station relays transmission packets communicated between a transmitting station and a receiving station.

BACKGROUND

These days, wireless communication systems using wireless communication channels for purposes of communication, for example, wireless communication systems based on WCDMA, CDMA2000 and the like are in widespread use on a global scale. In such wireless communication systems, a plurality of wireless base stations are installed and a wireless terminal device communicates with another communication device, for example, a communication terminal device via any of the wireless base stations. The service area of a wireless base station within which the wireless base station can communicate with wireless terminal devices has an overlap with the service area of a neighboring wireless base station so that when the wireless channel condition deteriorates, handover to the neighboring wireless base station may be executed.

Meanwhile, wireless technologies commonly used include code-division multiplexing, time-division multiplexing, frequency-division multiplexing, and OFDM (Orthogonal Frequency-Division Multiplexing), for example, which all enable a plurality of wireless terminal devices to simultaneously connect to a single wireless base station.

However, even inside the service area of a wireless base station where wireless communication is available, it is often difficult for a wireless terminal device to make use of high-speed communication because of poor wireless environment if the wireless terminal device is located near the boundary of the service area. Also, because of factors that obstruct the propagation of wireless signals such as buildings, an area in which the wireless terminal device has difficulty in establishing a satisfactory wireless connection with a wireless base station, that is, a so-called dead zone, can be created even at a location well inside the service area. In the circumstances, a method has been proposed in which a relay station (hereinafter referred to as RS) is installed within the service area of a wireless base station so that a wireless terminal device and the wireless base station can wirelessly communicate with each other via the RS.

Also, in connection with wireless communication systems using the OFDM technology and complying with the IEEE 802.16, specifications of relay stations have been defined by the IEEE 802.16j Task Group.

FIG. 17 is a diagram explaining an exemplary flow of automatic repeat request (ARQ) control according to the IEEE 802.16j. Specifically, FIG. 17 exemplifies End-to-End mode in which ARQ is executed at a wireless base station (hereinafter referred to as BS) and a wireless terminal device (hereinafter referred to as MS).

A PDU (Protocol Data Unit), which is a transmission unit for packets, includes fixed blocks each assigned a BSN (Block Sequence Number). In the example illustrated in FIG. 17, the PDU transmitted from the BS has a size corresponding to five fixed blocks. If the fixed block at the beginning of the PDU has the BSN "5", namely, BSN=5, the BSN of the fixed block at the tail of the PDU is "9". Also, the PDU is transmitted with the BSN of the first fixed block included in its header information. In the example of FIG. 17, the BSN "5" is included in the header information.

The RS receives the PDU from the BS and, if the wireless channel condition is poor, divides the PDU for transmission to the MS, in which case each divided PDU is transmitted with the BSN of the fixed block at the beginning thereof included in the header information. In the example of FIG. 17, the BSNs and "7" are included in the header information of the respective two divided PDUs. When a PDU is divided at the RS, the RS divides the PDU into groups of fixed blocks.

The MS notifies the BS whether the divided PDUs have been successfully received from the RS or not by sending information indicative of success or failure of reception, namely, Acknowledgement (ACK) information or Not Acknowledgement (NAK) information. In the example illustrated in FIG. 17, the divided PDU having the BSN "5" included in its header information, out of the two divided PDUs, fails to be received. Accordingly, the MS transmits, to the BS, NAK with respect to the BSNs "5" and "6" and ACK with respect to the BSNs "7" to "9". When notified of the NAK and the ACK, the BS retransmits the fixed blocks corresponding to the BSNs "5" and "6". In this manner, the information that failed to be received by the MS, in the example of FIG. 17, the divided PDU including the fixed blocks with the BSNs "5" and "6" is transmitted from the BS to the MS via the RS. The foregoing related to the IEEE 802.16 is described, for example, in IEEE Std 802.16-2009 and IEEE Std 802.16j-2009 identified below.

Also, a relay station and a relay method have been known which are capable of preventing conflict of FSN (Fragment Sequence Number) from occurring when a packet is divided by an IEEE 802.16j-compliant relay station. Such relay station and method are disclosed, for example, in International Publication Pamphlet No. WO 2008/078365 identified below.

International Publication Pamphlet No. WO 2008/078365
IEEE Std 802.16-2009
IEEE Std 802.16j-2009

The IEEE 802.16m Task Group has been newly launched and is currently in the process of developing and investigating specifications for next-generation wireless links. The ongoing development involves development of relay stations complying with the specifications for the new wireless links.

With the IEEE 802.16m, the ARQ process can be performed on PDUs of variable block size. That is, the size of the PDU used in the IEEE 802.16m is variable, and the BS transmits each PDU with a sequence number (SN) affixed thereto as a packet number. The MS generates ACK or NAK indicative of success or failure of reception of the PDU, and transmits the generated ACK or NAK to the BS via the RS. The ACK or NAK thus transmitted includes an SN whereby the PDU can be identified.

As regards the specifications for the next-generation wireless links wherein the ARQ process is performed on PDUs of variable block size, however, no proposal has been made so far as to how to generate divided PDUs to be transmitted from a relay station to a receiving station and how to smoothly carry out the ARQ process.

SUMMARY

According to one aspect of the present invention, there is provided a relay station for relaying transmission packets between a transmitting station and a receiving station, including a first communicator configured to receive a transmission packet transmitted from the transmitting station and affixed with a packet number; a packet re-constructor configured to generate a divided data unit by dividing data included in the received transmission packet, and generate a divided packet including the divided data unit affixed with the packet number and dividing position information indicating a position where the data in the transmission packet was divided to generate the divided data unit; and a second communicator configured to transmit the generated divided packet to the receiving station.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A relay station, a receiving station, a transmitting station and a packet communication system according to the present invention will be described in detail below.
(Embodiment 1)

Figure 1:
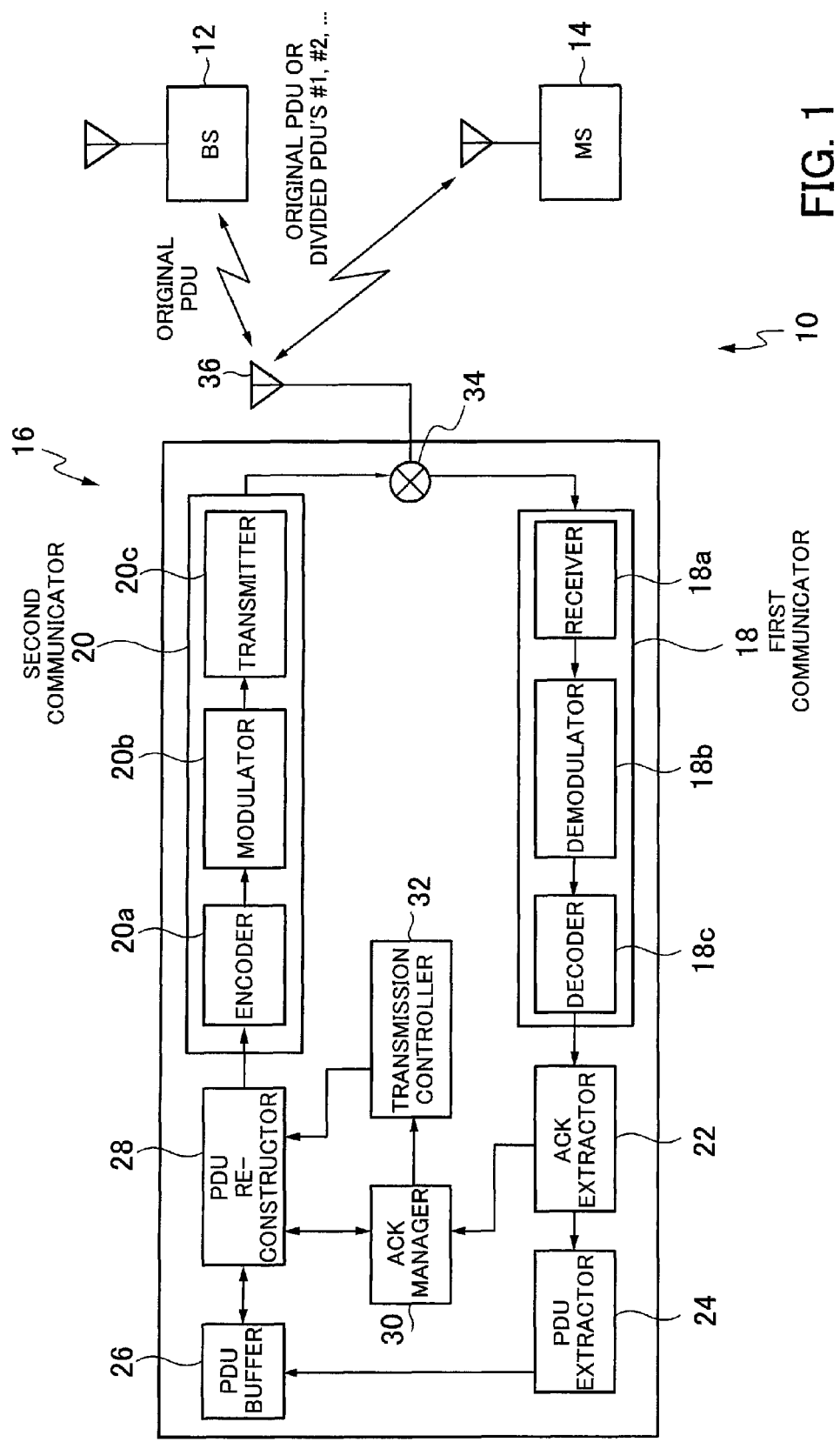
FIG. 1 is a block diagram of a packet communication system according to Embodiment 1.

FIG. 1 is a block diagram of a packet communication system 10 according to Embodiment 1. The packet communication system 10 illustrated in FIG. 1 includes a BS (wireless base station) 12, an MS (wireless terminal device) 14, and an RS (relay station) 16 for relaying packets communicated between the BS 12 and the MS 14. The MS 14 communicates with the BS 12 via the RS 16. In the case of downlink communication, the BS 12 acts as transmitting station and the MS 14 acts as receiving station. The MS 14 and the BS 12 can, however, be transmitting and receiving stations, respectively, as the case may be. In the following, explanation will be made with reference to the case of downlink communication where the BS 12 and the MS 14 act as transmitting and receiving stations, respectively. MAC-PDU, which is a transmission unit for packets, includes header information and a MAC-SDU (MAC-Service Data Unit), which is data contained in the payload. In the following, MAC-PDU and MAC-SDU will be merely referred to as PDU and SDU, respectively.
(Embodiment 1: Configuration of Relay Station)

FIG. 1 illustrates a schematic configuration of the RS 16, which is a relay station.

The RS 16 relays packets exchanged between the BS 12 and the MS 14. In this case, the RS 16 receives a PDU (hereinafter referred to as original PDU) transmitted from the BS and, depending on the condition of the wireless channel, successively generates divided PDUs such as divided PDUs #1, #2, . . . from the received original PDU, each divided PDU being smaller in size than the original PDU. The RS 16 then successively transmits the generated divided PDUs to the MS 14. When dividing the received original PDU into the divided PDUs #1, #2, . . . , the RS 16 affixes, to each of the divided PDUs #1, #2, . . . , dividing position information (hereinafter referred to as offset information) indicative of the position where the data in the original PDU was divided, and then transmits the divided PDUs to the MS 14.

The offset information (dividing position information) indicates the position where an original SDU was divided to obtain a divided SDU, which is a divided PDU excluding the header information. The original SDU is the SDU obtained by excluding the header information from the original PDU.

Depending on the wireless channel condition, the RS 16 transmits the original PDU directly to the MS 14 without dividing the original PDU. That is, the RS 16 divides the original PDU on an optional basis in accordance with the wireless channel condition.

The configuration of the RS 16 will be now described in detail.

The RS 16 includes a first communicator 18, a second communicator 20, an ACK extractor 22, a PDU extractor 24, a PDU buffer 26, a PDU re-constructor 28, an ACK manager 30, a transmission controller 32, a duplexer 34, and a transmitting-and-receiving antenna 36.

The first communicator 18 receives an original PDU or a divided PDU for retransmission, from the BS 12 as well as ACK or NAK from the MS 14. The original PDU has a packet number included in its header information. More specifically, the first communicator 18 includes a receiver 18a, a demodulator 18b, and a decoder 18c. The ACK is reception completion information indicating that reception of the original PDU has been completed, or reception acknowledgement information indicating that the divided PDU has been normally received. The NAK is reception incompletion information indicating that reception of the original PDU is not completed yet, or non-acknowledgement information indicating that the divided PDU failed to be normally received. An ACK including a packet number as well as the dividing position information serves as reception acknowledgement information with regard to a divided PDU, and an ACK including a packet number but not the dividing position information serves as reception completion information with regard to an original PDU, as described later. Like the ACK, a NAK including a packet number as well as the dividing position information serves as non-acknowledgement information with regard to a divided PDU, and a NAK including a packet number but not the dividing position information serves as reception incompletion information with regard to an original PDU.

The expression "normally received" or "reception completion" means that the PDU is judged to have been normally received by CRC (Cyclic Redundancy Check) carried out by the PDU extractor 24, as described later. Thus, the expression "non-acknowledgement" or "reception incompletion" indicates a situation where the reception of an original PDU or divided PDU failed, or a situation where as a result of the CRC (Cyclic Redundancy Check), the reception of an original PDU or divided PDU is not regarded as normal reception though the original PDU or the divided PDU was received.

The receiver 18a performs a wireless reception process on the received signal received by the transmitting-and-receiving antenna 36 and input to the duplexer 34, the wireless reception process including amplification with the use of a low-noise amplifier, frequency conversion (down-conversion) to baseband frequency, and AD conversion.

Using a demodulation scheme matching the modulation scheme used by the BS 12 or the MS 14, the demodulator 18b demodulates the received signal which has been subjected to the wireless reception process at the receiver 18a.

The decoder 18c decodes the received signal demodulated by the demodulator 18b, by using a scheme and a rate matching the encoding scheme and rate used by the BS 12 or the MS 14.

The second communicator 20, on the other hand, transmits the divided PDU received from the PDU re-constructor 28 and affixed with the packet number and the offset information to the MS 14, and also transmits, to the BS 12, the ACK or NAK received by the first communicator 18. Further, the second communicator 20 transmits the ACK or NAK generated by the transmission controller 32 to the BS 12.

More specifically, the second communicator 20 includes an encoder 20a, a modulator 20b, and a transmitter 20c.

The encoder 20a applies an error correction code, such as turbo code, to the signal received from the PDU re-constructor 28.

Using a modulation scheme such as QPSK or 16QAM, the modulator 20b modulates the encoded data received from the encoder 20a.

The transmitter 20c performs a wireless transmission process on the modulated signal received from the modulator 20b, to generate a transmit signal. The wireless transmission process includes DA conversion, frequency conversion (up-conversion) to radio frequency (RF), and amplification up to predetermined transmission power with the use of a high-power amplifier.

The duplexer 34 isolates the transmit signal and the received signal from each other. Specifically, the duplexer 34 outputs the transmit signal, received from the transmitter 20c, to the transmitting-and-receiving antenna 36, and also outputs the received signal from the transmitting-and-receiving antenna 36 to the receiver 18a.

The transmitting-and-receiving antenna 36 radiates the transmit signal, received from the duplexer 34, into the air toward the MS 14 or the BS 12, and also receives the signal radiated into the air from the MS 14 or the BS 12.

The ACK extractor 22 extracts the ACK or NAK including a packet number and offset information, from the decoded data received from the decoder 18c. The extracted ACK or NAK is sent to the ACK manager 30.

The PDU extractor 24 extracts the original PDU from the decoded data received from the decoder 18c. Specifically, the PDU extractor 24 performs CRC (Cyclic Redundancy Check) to determine whether the original PDU has been normally received or not, and acquires the original PDU. The original PDU thus acquired is sent to the PDU buffer 26.

The PDU buffer 26 temporarily holds the original PDU until the PDU is read out by the PDU re-constructor 28.

The PDU re-constructor 28 reads out the PDU stored in the PDU buffer 26 and generates, as needed, divided PDUs (divided SDUs) by extracting the SDU contained in the payload of the PDU and dividing the extracted SDU into a predetermined size. The PDU stored in and read out from the PDU buffer 26 includes an original PDU and a PDU obtained by dividing the original PDU.

Further, the PDU re-constructor 28 generates a divided PDU #1 by affixing, to the divided SDU, header information including the offset information, which indicates the position where the original SDU was divided to obtain the divided SDU, and the packet number of the original PDU. Similarly, the PDU re-constructor 28 generates a divided PDU #2 by affixing the header information to the remaining divided SDU from which the part corresponding to the divided PDU #1 has been removed, and stores the divided PDU #2 in the PDU buffer 26. The PDU re-constructor 28 thereafter reads out the divided PDU #2 from the PDU buffer 26. In like manner, the PDU re-constructor 28 generates divided PDUs #2, #3, The divided SDUs are generated as needed because a transmittable data amount D that can be allocated to packet transmission varies with change in the wireless channel condition. If the wireless channel condition is good and the transmittable data amount D is sufficiently large, the PDU may be transmitted as it stands without any divided PDU being generated. The transmittable data amount D is determined prior to the start of packet transmission, for example, in accordance with the modulation scheme and the code rate, which depend upon the condition of the wireless channel between the RS 16 and the MS 14, and an amount of available radio resources.

The size of the divided PDU may be determined as an integer multiple of a previously set size. Where the size of the divided PDU is defined as an integer multiple of the set size, the BS 12, the MS 14 and the RS 16 are preferably made to share the set size by making use of signaling or the like at the time of setting up a connection among the BS 12, the MS 14 and the RS 16 prior to the start of packet communication. In this case, the offset information may be information indicating which of the divided blocks with the set size the divided PDU in question corresponds to. By determining the set size, it is possible to make it easier for the BS 12, the MS 14 and the RS 16 to control and manage data.

Figure 2:
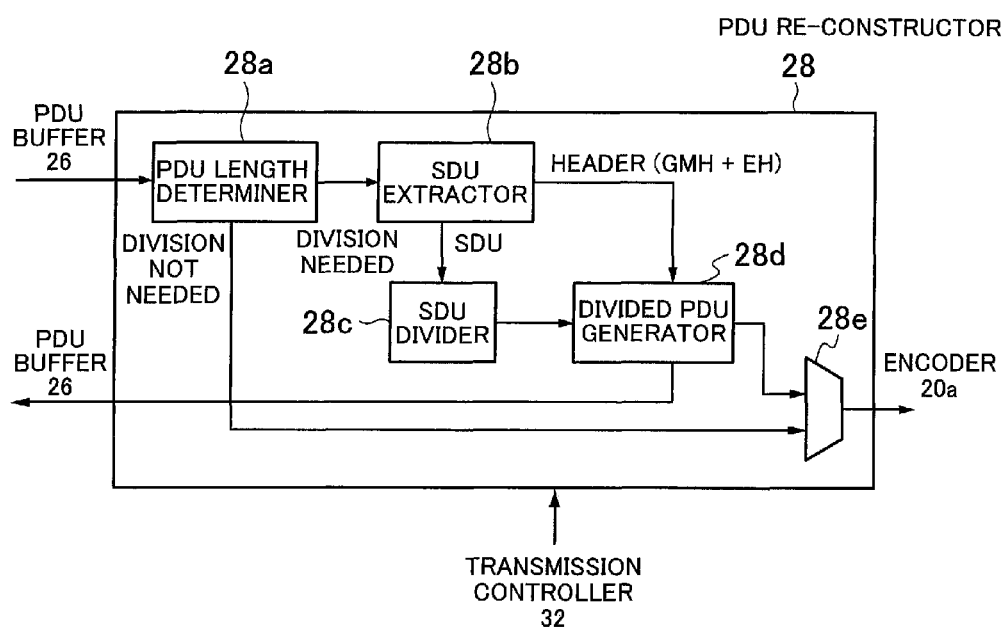
FIG. 2 is a block diagram illustrating details of a PDU re-constructor in a relay station illustrated in FIG. 1.

FIG. 2 is a block diagram illustrating details of the PDU re-constructor 28.

The PDU re-constructor 28 includes a PDU length determiner 28*a*, an SDU extractor 28*b*, an SDU divider 28*c*, a divided PDU generator 28*d*, and a selector 28*e*.

The PDU length determiner 28*a* reads out a PDU from the PDU buffer 26 in accordance with PDU transmission timing instructed by the transmission controller 32, and determines based on the transmittable data amount D specified by the transmission controller 32 whether to divide the PDU for transmission or not. The transmittable data amount D is determined in accordance with the condition of the wireless channel between the RS 16 and the MS 14 and the amount of available radio resources.

If it is judged that the PDU need not be divided, the PDU length determiner 28*a* sends, to the selector 28*e*, the PDU read out from the PDU buffer 26. On the other hand, if it is judged that the PDU needs to be divided, the PDU length determiner 28*a* sends the PDU to the SDU extractor 28*b*.

The SDU extractor 28*b* separates the PDU received from the PDU length determiner 28*a* into the header information, which includes a GMH (Generic MAC Header) and an FPEH (Fragment and Packing Extended Header), and the SDU contained in the payload, and sends the separated SDU to the SDU divider 28*c*. The header information is sent to the divided PDU generator 28*d*. In FIG. 2, the FPEH is indicated at EH (Extended Header).

The SDU divider 28*c* divides the SDU received from the SDU extractor 28*b* so that each divided SDU may not be larger than a data amount equal to the difference between the aforementioned transmittable data amount D, specified by the transmission controller 32, and the size of the offset information plus the header information, as explained later. The divided SDU obtained by dividing the SDU is sent to the divided PDU generator 28*d*. At this time, the offset information indicating the position where the SDU was divided is also sent to the divided PDU generator 28*d*.

The divided PDU generator 28*d* affixes the offset information received from the SDU divider 28*c* as well as the header information received from the SDU extractor 28*b* to the divided SDU received from the SDU divider 28*c*, to generate a divided PDU.

The header information includes the packet number of the original PDU, and the divided PDU generator 28*d* uses this packet number as the header information of the divided PDU.

The divided PDU generator 28*d* sends the divided PDU generated thereby to the selector 28*e*.

The selector 28*e* operates in accordance with the result of the determination by the PDU length determiner 28*a* to selectively send, to the second communicator 20, the PDU which has been received from the PDU length determiner 28*a* and which need not be divided, or the divided PDU received from the divided PDU generator 28*d*.

If the ACK or NAK extracted by the ACK extractor 22 includes a packet number and offset information, the ACK manager 30 extracts the packet number and the offset information. Then, based on the packet number and the offset information, the ACK manager 30 determines whether or not the MS 14 has received all data of the original PDU, that is, the original SDU in its entirety, transmitted from the BS 12 by means of the divided PDUs.

Where a packet number and offset information are included in the ACK or NAK, the ACK or NAK indicates reception acknowledgement or non-acknowledgement of the corresponding divided PDU. In this case, therefore, the above determination is made using the offset information and the packet number. That is, the ACK manager 30 checks the ACKs with an identical packet number to determine whether any offset information included in the ACK is missing or not. Specific information may be included in the divided PDU last generated by dividing a single original PDU, to allow the ACK manager 30 to identify the last divided PDU, whereby the last divided PDU can be easily identified.

On the other hand, if the ACK or NAK extracted by the ACK extractor 22 includes no offset information and includes a packet number only, then the ACK indicates that the reception of the original PDU by the MS 14 has been completed, and the NAK indicates that the reception is not completed yet.

In any case, the ACK manager 30 reports the ACK or NAK about the original PDU or divided PDU to the transmission controller 32.

The transmission controller 32 controls the generation of divided PDUs by the PDU re-constructor 28 and also determines the transmittable data amount in accordance with the wireless channel condition. The transmittable data amount is determined by the available radio resources (number of subchannels, number of symbols), the modulation scheme and the code rate.

Also, the transmission controller 32 determines the transmission timing so that a scheduler provided in the RS 16 can guarantee QoS (Quality of Service), and controls the transmission in accordance with the determined timing. Alternatively, the transmission controller 32 may control the transmission in accordance with the transmission timing determined by the BS 12. The transmission controller 32 provides the PDU re-constructor 28 with a trigger signal for transmission, to initiate the generation of divided PDUs to be transmitted.

Further, when the ACK or NAK indicating reception acknowledgement or non-acknowledgement of a divided PDU or the ACK or NAK indicating reception completion or incompletion of an original PDU is received from the ACK manager 30, the transmission controller 32 generates an ACK or NAK and causes the transmission process to start.

(Embodiment 1: Flow of Divided PDU Generation)

Figure 3:
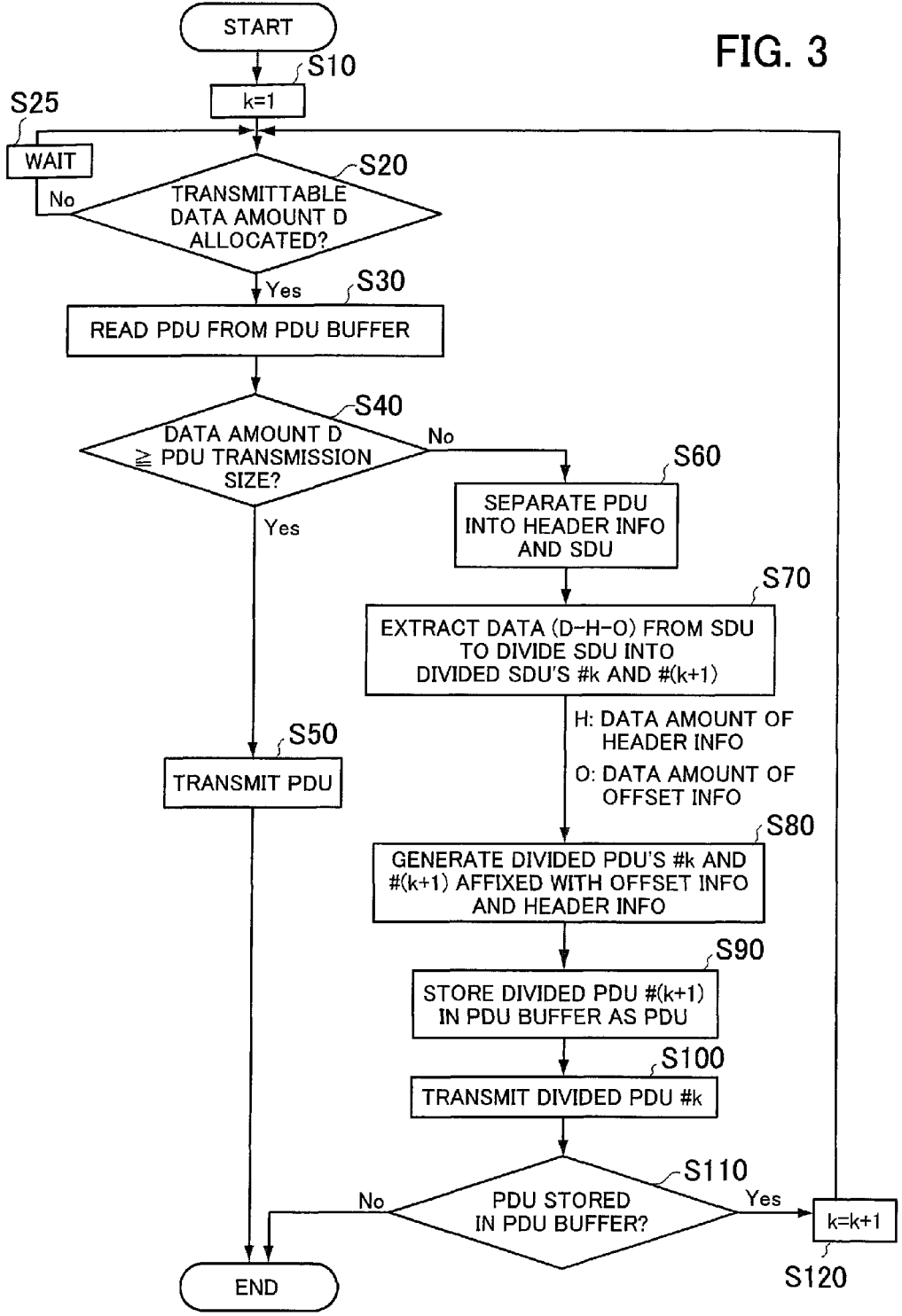
FIG. 3 is a flowchart exemplifying a flow of divided PDU generation executed in the relay station illustrated in FIG. 1.

Flow of the divided PDU generation executed in the RS 16 will be now explained. FIG. 3 illustrates an exemplary flow of the divided PDU generation executed in the relay station illustrated in FIG. 1. The divided PDU generation flow follows different courses depending upon whether the transmittable data amount D has been allocated or not.

First, the PDU re-constructor 28 sets a counter k to "1" (Step S10), and the PDU length determiner 28*a* determines whether the transmittable data amount D for packet transmission has been allocated or not (Step S20). The transmittable data amount D is allocated variably in accordance with the wireless channel condition.

If no transmittable data amount D has been allocated, the RS 16 remains in a transmission waiting state until the transmittable data amount D is allocated (Step S25).

On the other hand, if the transmittable data amount D has been allocated, the PDU length determiner 28*a* reads out the PDU stored in the PDU buffer 26 (Step S30), and compares a transmission size of the PDU with the transmittable data amount D (Step S40). If it is judged as a result of the comparison that the transmission size of the PDU is equal to or smaller than the transmittable data amount D, the PDU length determiner 28a concludes that the PDU need not be divided, and sends the PDU to the selector 28e. The selector 28e sends the PDU received from the PDU length determiner 28a to the encoder 20a. Consequently, the PDU which has been stored in and read from the PDU buffer 26 is transmitted to the MS 14 without being divided (Step S50).

If it is found as a result of the comparison in Step S40 that the transmission size of the PDU is larger than the data amount D, the PDU length determiner 28a judges that the PDU needs to be divided, and sends the PDU to the SDU extractor 28b.

The SDU extractor 28b first separates the PDU into the header information and the SDU (Step S60). The header information includes a GMH and an FPEH, and the packet number is included in the FPEH.

Subsequently, the SDU extractor 28b sends the separated SDU to the SDU divider 28c, and sends the header information to the divided PDU generator 28d.

The SDU divider 28c extracts part of the data from the beginning of the SDU in an amount corresponding to a data amount (D-H-O) which is obtained by subtracting a data amount H of the header information and a data amount O of the offset information indicative of the dividing position from the transmittable data amount D. The extracted data is handled as a divided SDU #k, and the remaining data as a divided SDU #(k+1). In this manner, the SDU is divided into the divided SDUs #k and #(k+1) (Step S70). The SDU divider 28c sends the divided SDUs #k and #(k+1) to the divided PDU generator 28d.

Figure 4A:
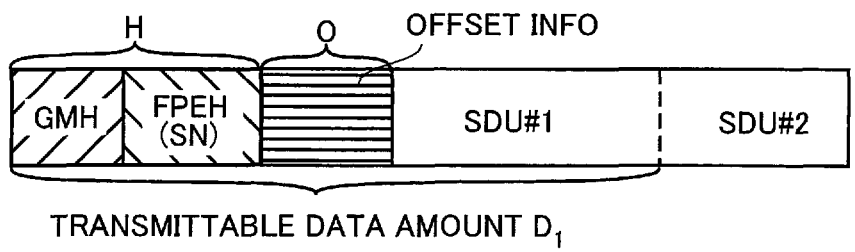
FIG. 4A illustrates how an original SDU is divided in the flow illustrated in FIG. 3.

FIG. 4A illustrates how the SDU is divided into SDUs #1 and #2 when a data amount $D_1$ is allocated as the transmittable data amount D.

The divided PDU generator 28d affixes the offset information and the header information to each of the divided SDUs #k and #(k+1) received from the SDU divider 28c, to generate divided PDUs #k and #(k+1) (Step S80). Where the divided PDU #(k+1) is not generated, the divided PDU #k is the last divided PDU. In this case, therefore, specific information is included in the divided PDU #k in order to allow the last divided PDU to be identified.

Then, the divided PDU generator 28d sends the divided PDU #(k+1) to the PDU buffer 26, which stores the divided PDU # (k+1) as a PDU (Step S90). Also, the divided PDU generator 28d sends the divided PDU #k to the selector 28e.

The selector 28e sends the divided PDU #k to the encoder 20a in accordance with the instruction from the divided PDU generator 28d. As a result, the divided PDU #k is transmitted (Step S100).

Figure 4B:
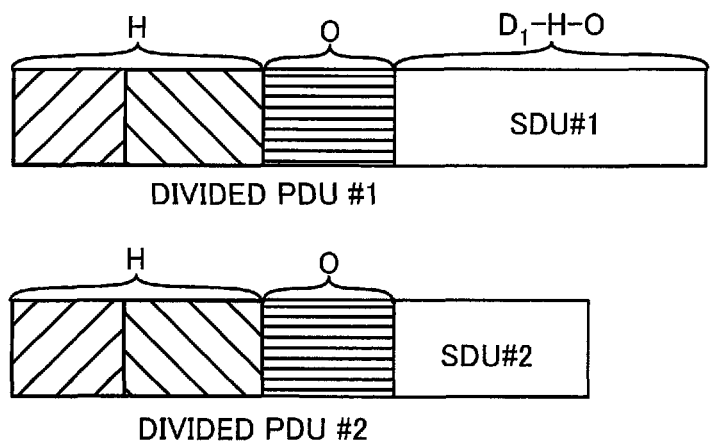
FIG. 4B illustrates divided SDUs, and FIG. 4C indicates an exemplary size of a divided SDU.

FIG. 4B illustrates the divided PDUs #1 and #2.

Further, at the subsequent instructed time for transmission, the transmission controller 32 determines whether or not the PDU buffer 26 has a PDU stored therein (Step S110). If there is no PDU stored in the PDU buffer 26, the transmission of the PDU stored in the PDU buffer 26 ends. On the other hand, if the PDU buffer 26 has a PDU stored therein, k is incremented by "1" (Step S120), and the flow returns to Step S20.

In this manner, the divided PDU is successively generated and transmitted until a decision is made in Step S110 that there is no divided PDU #(k+1) stored in the PDU buffer 26. If it is found in Step S60 that the PDU read out from the PDU buffer 26 includes offset information, the PDU is separated into the header information, the offset information and the SDU.

Figure 4C:
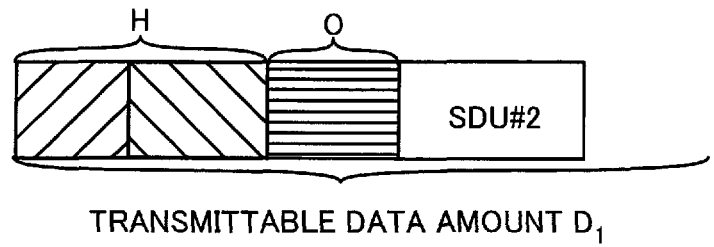

FIG. 4C indicates that as a result of the comparison in Step S40, the size of the divided PDU #2 read out from the PDU buffer 26 is found to be smaller than the transmittable data amount $D_1$. Consequently, the divided PDU #2 is transmitted in Step S50 without being further divided.

As stated above, the divided PDUs such as the divided PDUs #1, #2, . each include the offset information indicating the position where the SDU was divided to generate the divided SDU, and accordingly, the MS 14 can easily reproduce the original SDU by using the divided PDUs transmitted from the RS 16. In the event that the original SDU fails to be reproduced, therefore, the MS 14 can smoothly carry out an ARQ process for requesting the BS 12 to transmit the original PDU or the divided PDU.

The RS 16 and the BS 12 also can smoothly carry out the ARQ process by using the packet number and the offset information included in the divided packet transmitted to the MS 14.

(Embodiment 1: Configuration of Receiving Station)

Figure 5:
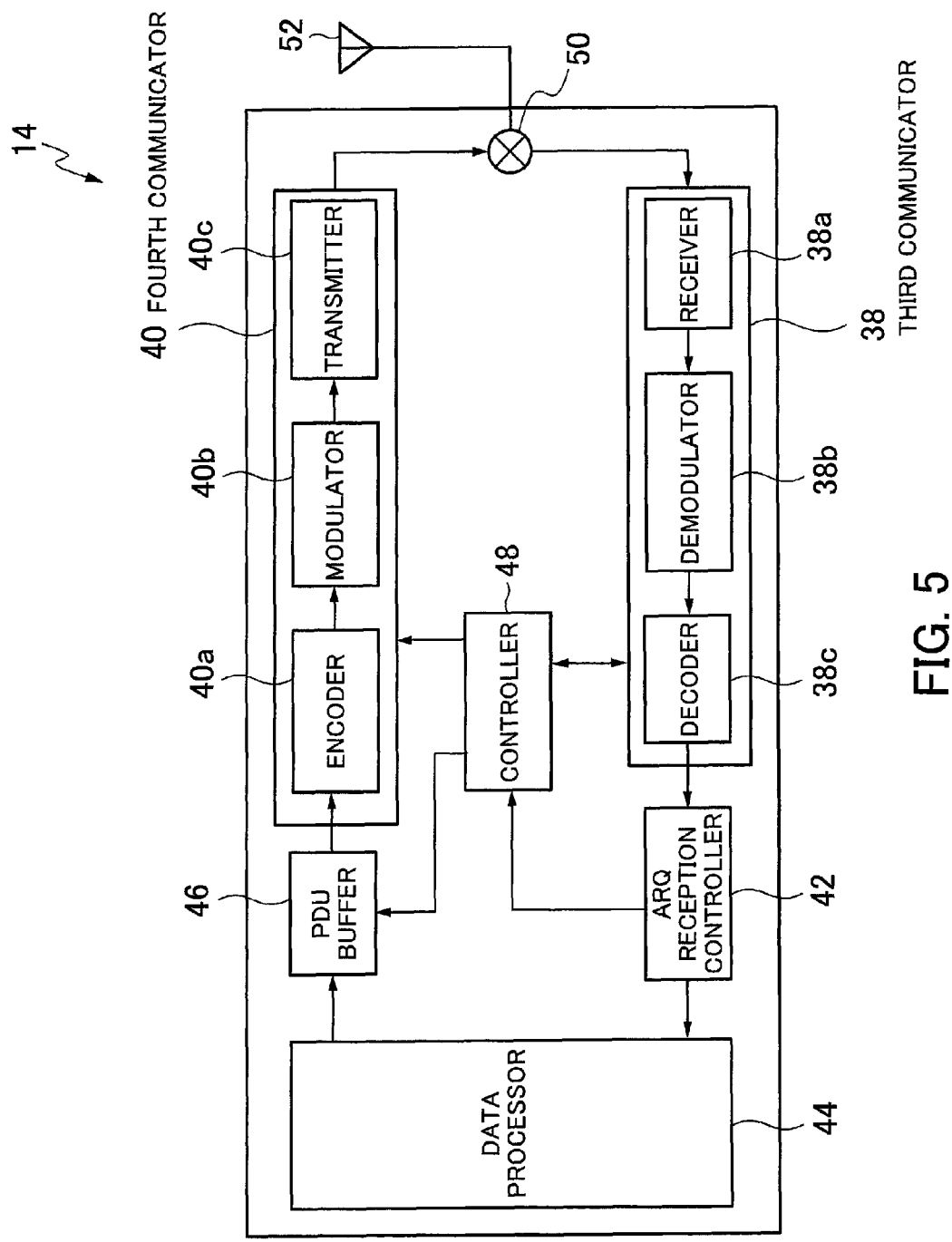
FIG. 5 is a block diagram of a wireless terminal device as a receiving station in the packet communication system illustrated in FIG. 1.

FIG. 5 is a block diagram of the MS 14 as a receiving station.

The MS 14 receives the divided PDUs #1, #2, successively transmitted from the RS 16, and reproduces the original SDU by using the offset information. If all divided PDUs or an original PDU has been normally received by the MS 14 and thus the original SDU can be reproduced, the MS 14 transmits an ACK indicating that the reception of all of the original SDU by the MS 14 has been completed. If the MS 14 fails to reproduce the original SDU, the MS 14 transmits a NAK indicating that the reception of all of the original SDU by the MS 14 is not completed yet. Alternatively, the MS 14 transmits an ACK or NAK indicative of reception acknowledgement or non-acknowledgement with respect to each of the divided PDUs #1, #2, . . . successively transmitted thereto.

Specifically, the MS 14 includes a third communicator 38, a fourth communicator 40, an ARQ reception controller 42, a data processor 44, a PDU buffer 46, a controller 48, a duplexer 50, and a transmitting-and-receiving antenna 52.

The third communicator 38 receives the divided PDUs #1, #2, . . . successively transmitted from the RS 16. More specifically, the third communicator 38 includes a receiver 38a, a demodulator 38b, and a decoder 38c.

The receiver 38a performs a wireless reception process on the received signal received by the transmitting-and-receiving antenna 52 and input to the duplexer 50, the wireless reception process including amplification with the use of a low-noise amplifier, frequency conversion (down-conversion) to the baseband frequency, and AD conversion.

The demodulator 38b demodulates the received signal which has been subjected to the wireless reception process at the receiver 38a, by using a demodulation scheme matching the modulation scheme used at the RS 16.

The decoder 38c decodes the received signal demodulated by the demodulator 38b, by using a scheme and a rate matching the encoding scheme and rate used by the RS 16.

The fourth communicator 40, on the other hand, transmits the PDU stored in the PDU buffer 46 and also transmits an ACK or NAK for the ARQ processing. The ACK includes information indicating reception completion of the original PDU transmitted from the BS 12, or information indicating reception acknowledgement of a divided PDU divided from the original PDU. The NAK includes information indicating reception incompletion of the original PDU, or information indicating non-acknowledgement of the divided PDU.

More specifically, the fourth communicator 40 includes an encoder 40a, a modulator 40b, and a transmitter 40c.

The encoder 40*a* applies an error correction code, such as turbo code, to the signal containing the PDU (original PDU or divided PDU) received from the PDU buffer 46, or to the ACK or NAK.

The modulator 40*b* modulates the encoded data received from the encoder 40*a*, by using a modulation scheme such as QPSK or 16QAM.

The transmitter 40*c* subjects the modulated signal received from the modulator 40*b*, to a wireless transmission process including DA conversion, frequency conversion (up-conversion) to radio frequency (RF) and amplification up to predetermined transmission power with the use of a high-power amplifier, to generate a transmit signal.

The duplexer 50 isolates the transmit signal and the received signal from each other. The duplexer 50 outputs, to the transmitting-and-receiving antenna 52, the transmit signal received from the transmitter 40*c*, and also outputs the received signal from the transmitting-and-receiving antenna 52 to the receiver 38*a*.

The transmitting-and-receiving antenna 52 radiates the transmit signal from the duplexer 50 into the air toward the RS 16, and also receives the signal radiated into the air from the RS 16.

The ARQ reception controller 42 determines whether or not a divided PDU has been normally received, determines whether or not the reception of an original PDU has been completed, or determines whether or not an original SDU has been received in its entirety by means of multiple divided PDUs. Depending on the result of determination, the ARQ reception controller 42 reproduces the original SDU. Also, the ARQ reception controller 42 starts an internal timer to restrict the time during which the divided PDUs with an identical packet number have to be received.

The data processor 44 performs an image display process, an audio output process and the like by using the reproduced SDUs. Further, the data processor 44 generates PDUs to be transmitted from the MS 14 when the MS 14 is acting as transmitting station.

The PDU buffer 46 temporarily stores the PDU generated by the data processor 44 and, in accordance with instructions from the controller 48, sends the stored PDU to the encoder 40*a*.

The controller 48 monitors and controls the individual transmission and reception functions of the MS 14. For example, in accordance with the result of the reception-related determination by the ARQ reception controller 42, the controller 48 generates an ACK or NAK and sends the generated ACK or NAK to the fourth communicator 40 for transmission. Also, the controller 48 processes control data exchanged with the BS 12. For example, the controller 48 takes care of registration of functions supporting the MS 14, authentication, generation and exchange of authentication keys, management of the status of the wireless channel, and the like. Further, in accordance with information on the uplink frequency band allocation received from the BS 12, the controller 48 controls the fourth communicator 40 to cause same to transmit user data or control data to the BS 12.

(Embodiment 1: ARQ Process 1 of Receiving Station)

Figure 6:
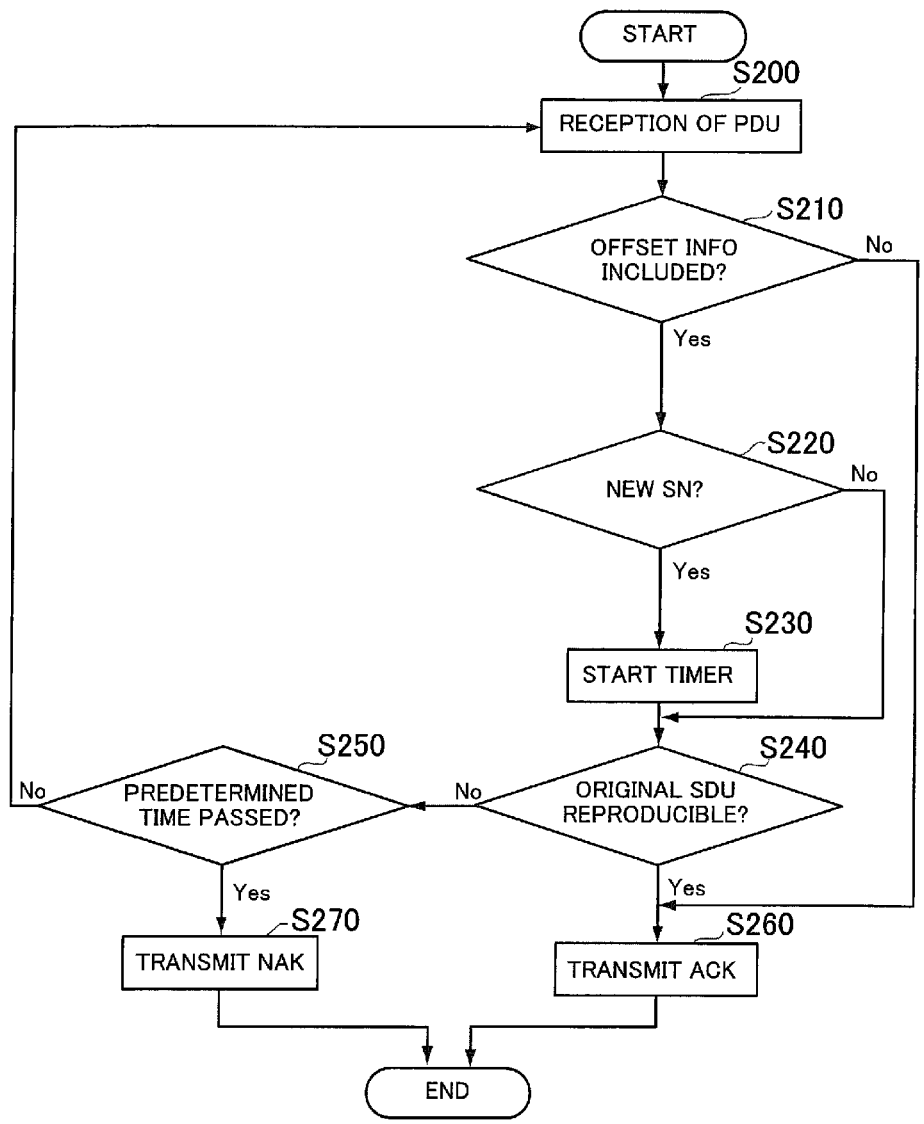
FIG. 6 is a flowchart illustrating an exemplary flow of ARQ process executed in the wireless terminal device illustrated in FIG. 5.
Figure 7:
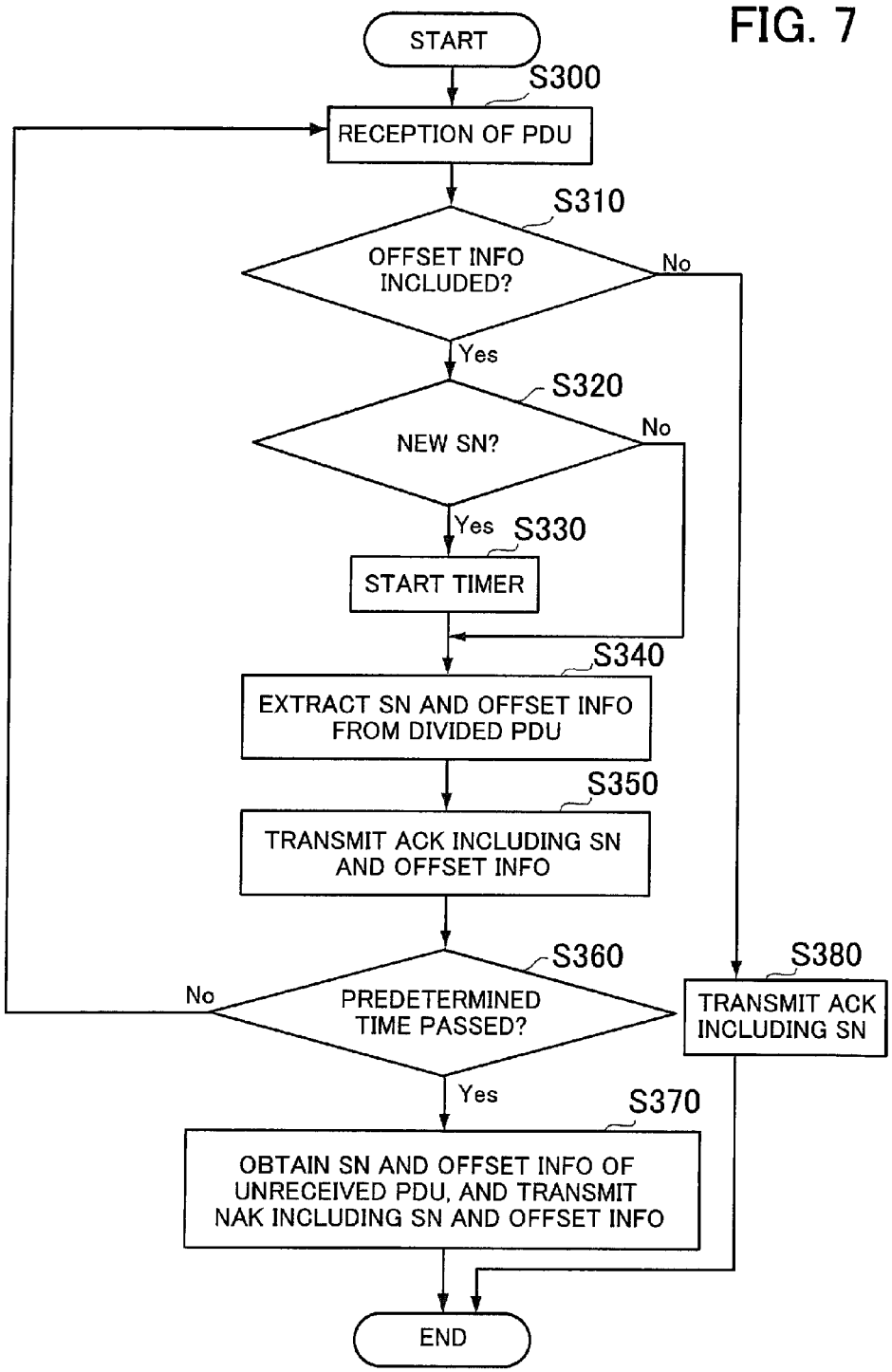
FIG. 7 is a flowchart illustrating another exemplary flow of ARQ process executed in the wireless terminal device illustrated in FIG. 5.

FIG. 6 illustrates an exemplary flow of the ARQ process executed in the MS 14. The ARQ process exemplified in FIG. 6 will be referred to as ARQ process 1. FIG. 7 illustrates another exemplary flow of the ARQ process executed in the MS 14. The ARQ process exemplified in FIG. 7 will be referred to as ARQ process 2 and will be explained after the description of the ARQ process 1.

First, the ARQ process 1 illustrated in FIG. 6 will be outlined.

In the ARQ process 1, the MS 14 determines whether all of the original SDU originated by the BS 12 has been received by means of the divided PDUs successively transmitted from the RS 16 and thus the original SDU can be reproduced or not. If all of the original SDU has been received and can be reproduced, the MS 14 transmits, to the RS 16, an ACK indicating that reception of all of the original SDU has been completed. If, on the other hand, not all of the original SDU has been received and thus the original SDU fails to be reproduced, the MS 14 transmits, to the RS 16, a NAK indicating that reception of the original PDU is not completed yet.

Specifically, first, a PDU is received by the third communicator 38 (Step S200). At this time, the third communicator 38 is unable to determine whether the received PDU is a divided PDU generated from an original PDU by the RS 16 or an original PDU itself.

Subsequently, the ARQ reception controller 42 determines whether or not the received PDU includes offset information (Step S210). This determination enables the ARQ reception controller 42 to learn whether the received PDU is a divided PDU or not. If the received PDU includes offset information, then the received PDU is a divided PDU.

If it is judged in Step S210 that the received PDU is not a divided PDU, that is, if the received PDU is an original PDU, the flow proceeds to Step S260. The controller 48 extracts the packet number included in the header information of the received original PDU, then generates an ACK signal including the packet number, and transmits the generated ACK by means of the fourth communicator 40 to the RS 16.

On the other hand, if it is judged as a result of the determination in Step S210 that the offset information is included in the received PDU, that is, if the received PDU is a divided PDU generated by dividing an original PDU, the ARQ reception controller 42 extracts the packet number from the header information and determines whether the packet number (hereinafter referred to as SN) is a new number or not (Step S220). Generally, original PDUs are successively transmitted from the BS 12 with sequence numbers affixed thereto as their packet numbers, and accordingly, if the received SN is new, it is judged that the received PDU is a divided PDU of a new original PDU. In this case, the ARQ reception controller 42 starts the internal timer (Step S230). The timer is started in order to monitor the reception of divided PDUs while restricting the time within which the divided PDUs have to be successively received.

Subsequently, the ARQ reception controller 42 determines whether or not the original SDU can be reproduced with all of the original SDU normally received by means of the divided PDUs (Step S240). Whether the original SDU can be reproduced with all of the original SDU normally received or not is determined by checking the offset information and the packet number of the divided PDUs to see if the divided SDUs contained in the received divided PDUs are sufficient or insufficient to complete the original SDU. Original PDUs are successively generated and transmitted from the BS 12, and the RS 16 divides a single original PDU into multiple divided PDUs, if necessary, so that a plurality of PDUs with an identical SN are transmitted from the RS 16. Since the RS 16 includes specific information in the last one of the divided PDUs, the MS 14 is able to recognize that a divided PDU including the specific information is the last divided PDU. Where the last divided PDU including the specific information is not received yet, the result of the decision in Step S240 is of course "No".

If it is found in Step S240 that the reproduction is not possible yet, the ARQ reception controller 42 determines whether or not a predetermined time has elapsed from the start of the timer in Step S230 (Step S250). If the predetermined time has not elapsed yet, the MS 14 stands by for reception of divided PDUs. When a PDU is received in the standby mode (Step S200), Step S210 and the succeeding steps are repeatedly executed. On the other hand, if it is judged in Step S240 that the original SDU can be reproduced with all of the divided PDUs normally received, the ARQ reception controller 42 reports to the controller 48 to that effect. On receiving the report that reception of all of the original SDU has been completed, the controller 48 generates an ACK including the SN and indicating that reception of the original PDU has been completed. Further, the controller 48 causes the fourth communicator 40 to transmit the generated ACK to the RS 16 (Step S260).

On the other hand, if it is judged in Step S240 that the original SDU is not yet normally received in its entirety by means of the divided PDUs and thus fails to be reproduced and it is further judged in Step S250 that the predetermined time has passed, the ARQ reception controller 42 reports to the controller 48 to that effect. On receiving the report, the controller 48 generates a NAK including the SN of the received divided PDU. Then, the controller 48 causes the fourth communicator 40 to transmit the generated NAK to the RS 16 (Step S270).

The aforementioned ARQ process 1 permits the MS 14 to transmit an ACK indicating that the reception of the entire original SDU has been completed, or a NAK indicating that the reception is not completed yet. The BS 12 can therefore receive, via the RS 16, information indicating whether the reception of the PDU specified by the SN has been completed or not, thus enabling the BS 12 to retransmit the incompletely received PDU.

In the ARQ process 1 described above, the MS 14 determines whether or not the original SDU has been normally received in its entirety by means of the divided PDUs, and transmits an ACK or NAK in accordance with the result of the determination. Alternatively, the MS 14 may be configured to transmit, to the RS 16, an ACK or NAK including the SN and offset information contained in each divided PDU received by the MS 14, as in the ARQ process 2 explained below. In this case, the RS 16 may determine whether or not the MS 14 has normally received all of the original SDU. Also, the RS 16 may be configured to transmit an ACK or NAK of the divided PDU to the BS 12.

(Embodiment 1: ARQ Process 2 of Receiving Station)

FIG. 7 illustrates a flow of the ARQ process 2 wherein the ACK or NAK including the SN and offset information of a divided PDU is transmitted to the RS 16.

First, a PDU is received by the third communicator 38 (Step S300). At this time, the third communicator 38 is unable to determine whether the received PDU is a divided PDU or an original PDU.

Subsequently, the ARQ reception controller 42 determines whether or not the received PDU includes offset information (Step S310). This determination enables the ARQ reception controller 42 to learn whether the received PDU is a divided PDU or not. If the received PDU is not a divided PDU, that is, if the received PDU is an original PDU, the controller generates an ACK including the SN and causes the fourth communicator to transmit the generated ACK to the RS 16 (Step S380).

On the other hand, if the offset information is included in the received PDU, that is, if the received PDU is a divided PDU, the ARQ reception controller 42 extracts the SN, namely, the packet number, from the header information and determines whether the SN is a new number or not (Step S320). Generally, original PDUs are successively transmitted from the BS 12 with sequence numbers affixed thereto as their packet numbers, and accordingly, if the received SN is new, it is judged that the received PDU is a divided PDU of a new original PDU. In this case, the ARQ reception controller 42 starts the internal timer (Step S330). The timer is started in order to monitor the reception of divided PDUs while restricting the time within which the divided PDUs have to be successively received.

If the SN is not a new number, the flow proceeds to Step S340.

Subsequently, the ARQ reception controller 42 extracts the SN and offset information contained in the received divided PDU (Step S340).

The ARQ reception controller 42 sends the SN and offset information of the received divided PDU to the controller 48.

The controller 48 generates an ACK including the SN and offset information of the received divided PDU, and causes the fourth communicator 40 to transmit the generated ACK to the RS 16 or the BS 12.

The ACK is reception acknowledgement information indicating that the divided PDU specified by the SN and the offset information has been received.

Subsequently, the controller 48 determines whether or not a predetermined time has elapsed from the start of the timer (Step S360). If the predetermined time has not elapsed yet, the MS 14 stands by for reception of PDUs from the BS 16. When a PDU is received in the standby mode (Step S310), the flow proceeds to Step S310 and then the succeeding steps. If, on the other hand, it is judged in Step S360 that the predetermined time has passed, the controller 48 obtains offset information and SN of a divided PDU that has not yet been received, and generates a NAK including the SN and offset information thus obtained. The offset information of the divided PDU not received yet can be obtained, as missing offset information, from the offset information of the already received divided PDU. The controller 48 causes the fourth communicator 40 to transmit the generated NAK to the RS 16 (Step S370). The divided PDU not received yet has an SN identical with that of the divided PDU already received, and only the offset information differs between the two.

In the ARQ process 2 explained above with reference to FIG. 7, the MS 14 transmits the offset information specifying the divided PDU not received yet to the RS 16, and accordingly, the BS 12 can extract only the unreceived data for packet transmission on the basis of the offset information included in the NAK received via the RS 16.

Thus, in accordance with the ARQ process 2, the ACK or NAK including the SN and the offset information is transmitted from the MS 14 and received by the BS 12 via the RS 16.

(Embodiment 1: Configuration of Transmitting Station)

The following is a description of the BS 12 which carries out packet transmission in accordance with the result of the ARQ process 1 or 2.

The BS 12 not only transmits original PDUs which are to be relayed by the RS 16, but retransmits an original PDU or transmits a divided PDU in response to the NAK which the MS 14 transmits in accordance with the result of the ARQ process 1 or 2.

Figure 8:
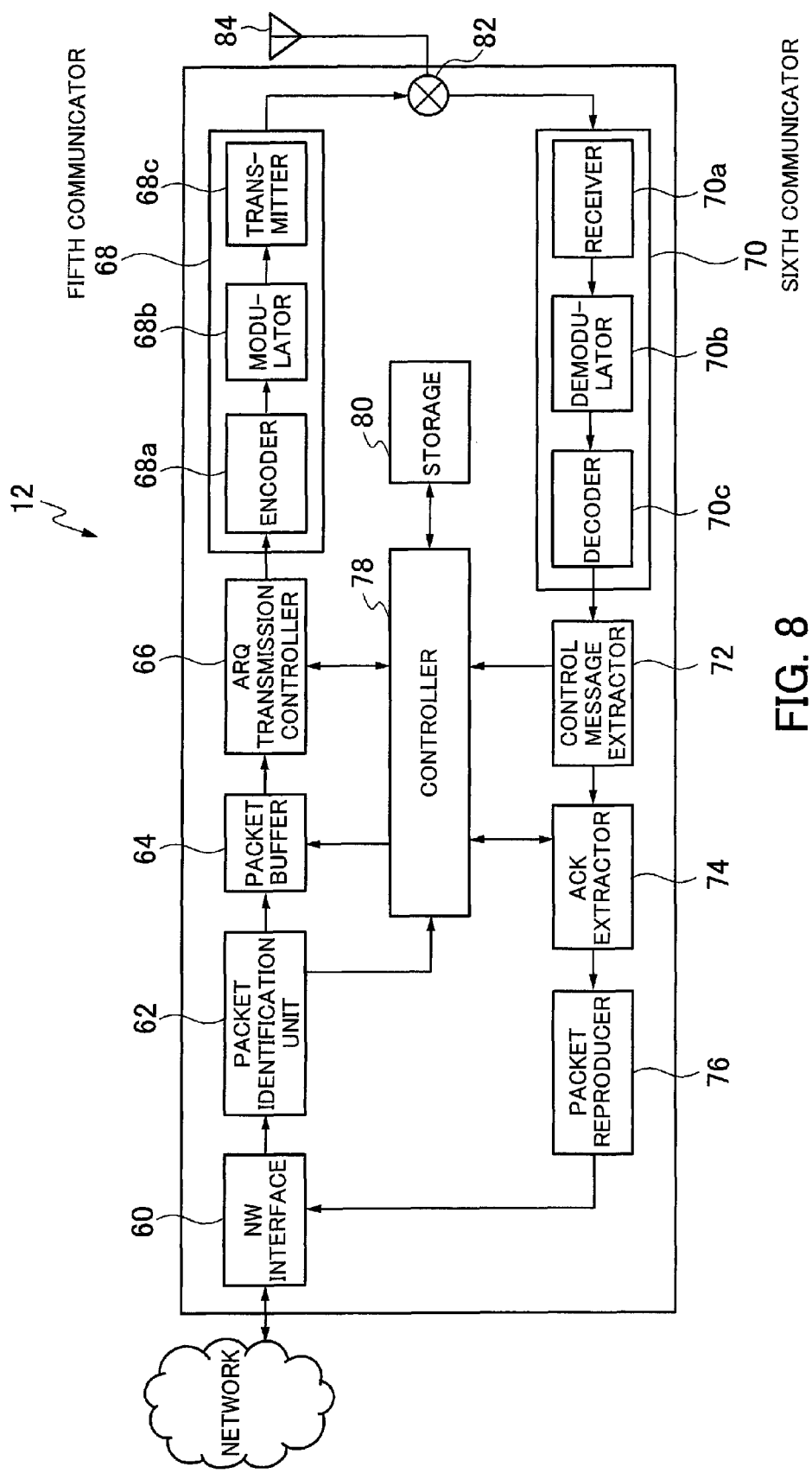
FIG. 8 is a schematic block diagram of a wireless base station as a transmitting station in the packet communication system illustrated in FIG. 1.

FIG. 8 is a schematic block diagram of the BS 12.

The BS 12 includes a network interface 60, a packet identification unit 62, a packet buffer 64, an ARQ transmission controller 66, a fifth communicator 68, a sixth communicator 70, a control message extractor 72, an ACK extractor 74, a packet reproducer 76, a controller 78, a storage 80, a duplexer 82, and a transmitting-and-receiving antenna 84.

The network interface 60 is connected to a network and receives incoming data transmitted over the network. The packet identification unit 62 creates header information including a packet identifier, and affixes the header information to the data to generate an original PDU.

The packet buffer 64 stores the generated original PDU. The original PDU is read out by the ARQ transmission controller 66 in accordance with transmission timing instructed by the controller 78.

The ARQ transmission controller 66 generates a PDU or divided PDU in accordance with the NAK received from the controller 78. Further, where the BS 12 acts as receiving station, the ARQ transmission controller 66 generates an ACK or NAK indicating reception acknowledgement or non-acknowledgement of the original PDU.

Details of the ARQ transmission controller 66 will be described later.

The fifth communicator 68 generates a transmit signal based on the PDU or divided PDU received from the ARQ transmission controller 66. The fifth communicator 68 includes an encoder 68a, a modulator 68b, and a transmitter 68c.

The encoder 68a applies an error correction code, such as turbo code, to the signal received from the ARQ transmission controller 66.

The modulator 68b modulates the encoded data received from the encoder 68a, by using a modulation scheme such as QPSK or 16QAM.

The transmitter 68c subjects the modulated signal received from the modulator 68b, to a wireless transmission process including DA conversion, frequency conversion (up-conversion) to radio frequency (RF) and amplification up to predetermined transmission power with the use of a high-power amplifier, to generate a transmit signal.

The sixth communicator 70 receives the ACK or NAK from the MS 14 via the RS 16 or receives a PDU. The sixth communicator 70 includes a receiver 70a, a demodulator 70b, and a decoder 70c.

The receiver 70a performs a wireless reception process on the received signal received by the transmitting-and-receiving antenna 84 and input to the duplexer 82, the wireless reception process including amplification with the use of a low-noise amplifier, frequency conversion (down-conversion) to the baseband frequency, and AD conversion.

The demodulator 70b demodulates the received signal which has been subjected to the wireless reception process at the receiver 70a, by using a demodulation scheme matching the modulation scheme used at the RS 16.

The decoder 70c decodes the received signal demodulated by the demodulator 70b, by using a scheme and a rate matching the encoding scheme and rate used by the RS 16.

The control message extractor 72 extracts a control message included in the received signal, and sends the extracted control message to the controller 78.

The ACK extractor 74 extracts the ACK or NAK from the received signal. The extracted ACK or NAK is sent via the controller 78 to the ARQ transmission controller 66.

While the BS 12 acts as receiving station, the packet reproducer 76 reproduces data of the PDU received from a different transmitting station. The reproduced PDU is sent to the network interface 60.

The controller 78 manages and controls the operations of individual parts of the BS 12. During the ARQ process, the controller 78 receives the ACK or NAK extracted by the ACK extractor 74 and sends the extracted ACK or NAK to the ARK transmission controller 66.

The storage 80 holds parameters associated with the transmission and reception processes, for example, parameters related to modulation frequency, modulation scheme, encoding scheme, encoding rate and the like. Such parameters are read out as needed by the controller 78.

The duplexer 82 isolates the transmit signal and the received signal from each other. The duplexer 82 outputs, to the transmitting-and-receiving antenna 84, the transmit signal received from the transmitter 68c, and also outputs the received signal from the transmitting-and-receiving antenna 84 to the receiver 70a.

The transmitting-and-receiving antenna 84 radiates the transmit signal from the duplexer 82 into the air toward the RS 16, and also receives the signal radiated into the air from the RS 16.

Figure 9:
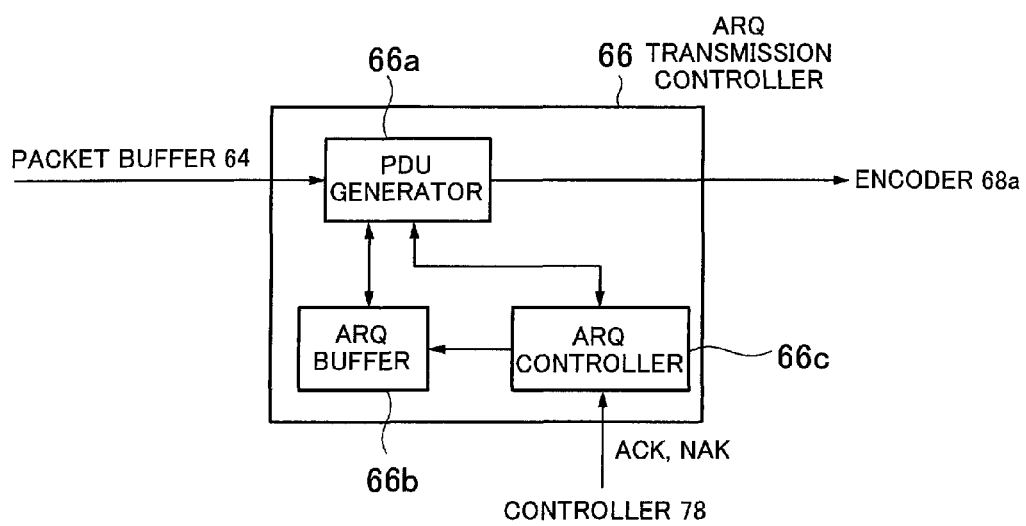
FIG. 9 is a block diagram illustrating details of an ARQ transmission controller in the wireless base station illustrated in FIG. 8.

FIG. 9 is a block diagram illustrating details of the ARQ transmission controller 66.

The ARQ transmission controller 66 includes a PDU generator 66a, an ARQ buffer 66b, and an ARQ controller 66c.

The PDU generator 66a generates a PDU to be transmitted in accordance with instructions from the ARQ controller 66c. Specifically, when a NAK is received, the PDU generator 66a extracts a divided SDU from the original SDU by using the packet number and offset information included in the received NAK, to generate a divided PDU for retransmission. More specifically, the PDU generator 66a reads out the original PDU stored in the ARQ buffer 66b, then extracts the corresponding part of the original SDU, and affixes header information to the extracted part, to generate the divided PDU. The PDU generator 66a sends the divided PDU to the encoder 68a. Alternatively, in accordance with instructions from the controller 78, the PDU generator 66a reads out an original PDU stored in the packet buffer 64, and sends the original PDU to the encoder 68a without performing any process on the original PDU.

The ARQ buffer 66b stores the original PDU transmitted before.

The ARQ controller 66c extracts the SN included in the ACK or NAK received from the controller 78, and also controls the management of storage of the original PDU in the ARQ buffer 66b as well as the generation of a transmission PDU to be generated by the PDU generator 66a. Specifically, when an ACK including an SN is received from the controller 78, the ARQ controller 66c instructs the ARQ buffer 66b to discard the original PDU with the corresponding SN stored therein. On the other hand, when a NAK including an SN is received from the controller 78, the ARQ controller 66c instructs the PDU generator 66a to read out the original PDU with the corresponding SN stored in the ARQ buffer 66b. The PDU generator 66a sends the original PDU thus read out to the encoder 68a for transmission.

If the received NAK includes offset information besides the SN, the ARQ controller 66c sends the SN and the offset information to the PDU generator 66a. Based on the SN, the PDU generator 66a reads out the corresponding original PDU from the ARQ buffer 66b and, based on the offset information, divides the original SDU in the original PDU to generate a divided SDU. Then, the PDU generator 66a affixes header information to the divided SDU to generate a divided PDU, and sends the divided PDU to the encoder 68a for transmission.

(Embodiment 1: ARQ Process of Transmitting Station)

Figure 10:
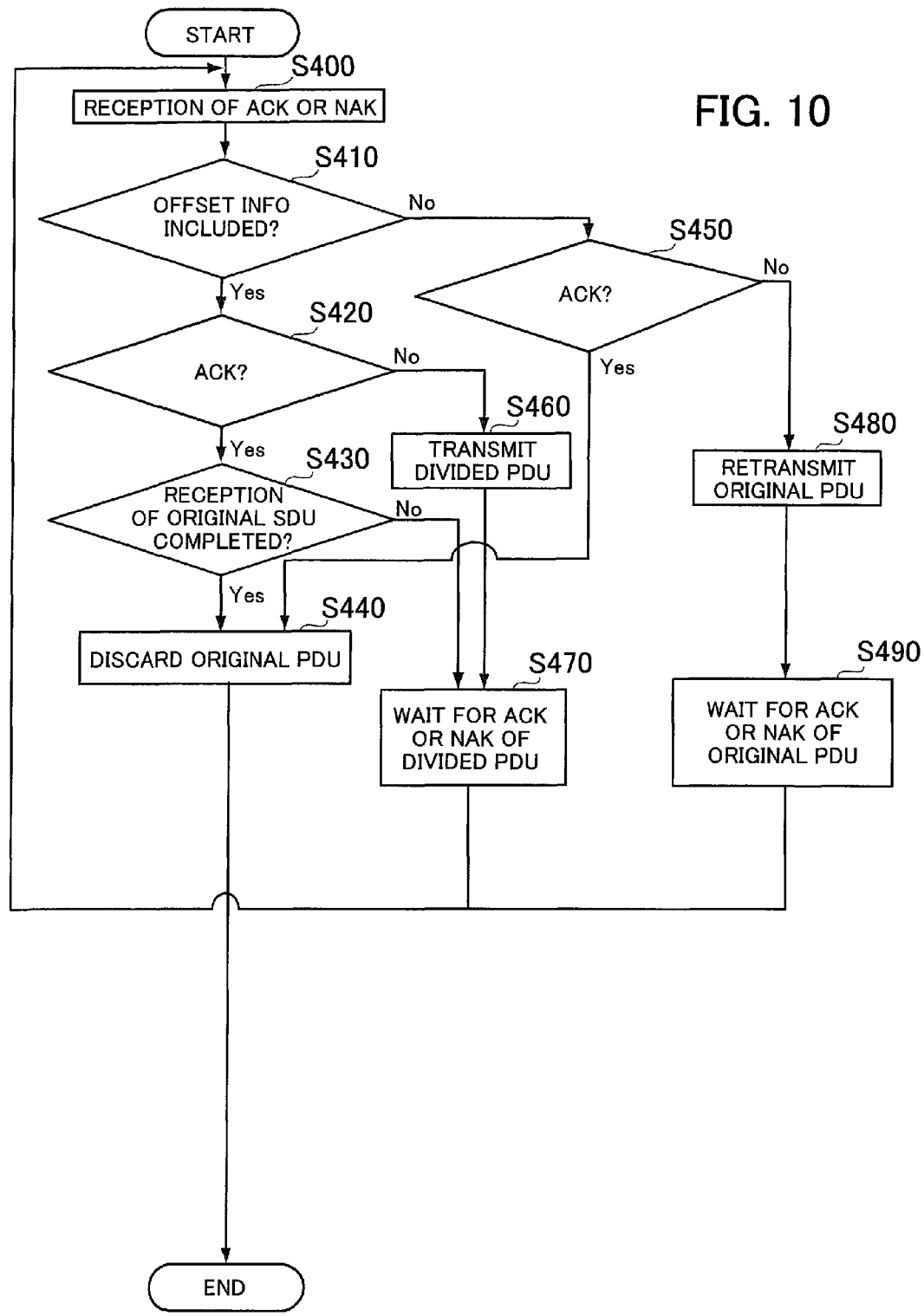
FIG. 10 is a flowchart illustrating an exemplary flow of ARQ process executed in the wireless base station illustrated in FIG. 8.

FIG. 10 illustrates an exemplary flow of the ARQ process executed in the BS 12.

First, the flow of the ARQ process will be outlined. In the ARQ process, the BS 12 receives an ACK or NAK transmitted thereto from the MS 14 via the RS 16, and determines whether the reception of the original SDU in its entirety has been completed or not. If the reception of the entire original SDU by the MS 14 is not yet completed, the BS 12 transmits the original PDU transmitted before or a divided PDU generated from part of the original PDU which is not yet completely received.

In the following, the process will be described in detail.

First, when an ACK or NAK is received by the BS 12, the ACK extractor 74 extracts the ACK or NAK (Step S400). The extracted ACK or NAK is sent to the controller 78.

Subsequently, the controller 78 determines whether or not the ACK or NAK received from the ACK extractor 74 includes offset information (Step S410). An ACK or NAK including the offset information is reception acknowledgement information or non-acknowledgement information with respect to a divided PDU generated at the RS 16 by dividing an original PDU. On the other hand, an ACK or NAK including no offset information is information indicating reception completion or reception incompletion of an original PDU itself. The information is sent back in a situation where the RS 16 transmitted the original PDU without dividing the PDU, or in a situation where the RS 16 divided the original PDU and transmitted the divided PDUs but the original PDU was incompletely received because one or more of the divided PDUs failed to be normally received. In either case, the original PDU is not yet completely received, and therefore, the process follows the same procedure.

If it is judged in Step S410 that offset information is included in the ACK or NAK, that is, if the received ACK or NAK is information related to a divided PDU, the controller 78 determines whether the received information is ACK or not (Step S420). If it is judged that the received information is ACK, the controller 78 determines based on the offset information whether reception of the entire original SDU has been completed or not (Step S430). The controller 78 can learn the size of the data of the original SDU from the corresponding original PDU stored in the ARQ buffer 66*b*, and by using the data size, the offset information and the packet number included in the multiple ACKs received until then, the controller 78 can determine whether or not the MS 14 has completed the reception of the entire original SDU transmitted from the BS 12. If the original SDU has been received in its entirety, the controller 78 sends the ACK to the ARQ controller 66*c* to instruct same to output an instruction to discard the original PDU. Following the instruction, the ARQ buffer 66*b* discards the corresponding original PDU (Step S440). On the other hand, if it is judged in Step S430 that reception of the entire original SDU is not yet completed, the BS 12 waits for reception of an ACK or NAK of a divided PDU on the assumption that ACKs are successively received from the MS 14 via the RS 16 (Step S470).

If it is judged in Step S420 that the received information is not ACK but NAK, the controller 78 sends the NAK to the ARQ controller 66*c* of the ARQ transmission controller 66 and also instructs the ARQ controller 66*c* to generate a divided PDU in accordance with the offset information and transmit the generated divided PDU. The ARQ controller 66*c* instructs the PDU generator 66*a* to read out the corresponding original PDU from the ARQ buffer 66*b*, then extract part of the original PDU, that is, part of the original SDU, in accordance with the offset information, and generate a divided PDU. Using the fifth communicator 68, the BS 12 transmits the divided PDU to the RS 16 (Step S460). At the RS 16, the first communicator 18 receives the divided PDU, and the divided PDU thus received is then transmitted to the MS 16 by means of the second communicator 20. After transmitting the divided PDU, the BS 12 waits for reception of an ACK or NAK of the divided PDU (Step S470). The ARQ process then returns to Step S400.

If it is judged in Step S410 that the ACK or NAK includes no offset information, the controller 78 determines whether the received information is ACK or not (Step S450). If the received information is ACK, then it means that the reception of the original PDU transmitted from the BS 12 has been completed. Accordingly, the process proceeds to Step S440, in which the controller 78 sends an instruction, along with the ACK, to the ARQ controller 66*c* to discard the corresponding original PDU. As a result, the ARQ buffer 66*b* discards the corresponding original PDU (Step S440).

On the other hand, if it is judged in Step S450 that the received information is not ACK but NAK, the controller 78 sends the NAK to the ARQ controller 66*c* and instructs same to cause the PDU generator 66*a* to read out the corresponding original PDU from the ARQ buffer 66*b* and to transmit the original PDU. Consequently, based on the SN included in the NAK, the PDU generator 66*a* reads out the corresponding original PDU from the ARQ buffer 66*b* and sends the original PDU to the encoder 68*a*. Thus, the BS 12 retransmits the original PDU to the RS 16 (Step S480). The BS 12 thereafter waits for reception of an ACK or NAK of the retransmitted original PDU (Step S490). The ARQ process then returns to Step S400.

As stated above, the BS 12 retransmits an original PDU or transmits a divided PDU, and discards the original PDU.

(Embodiment 1: Overall Flow 1 of ARQ Process)

Figure 11A:
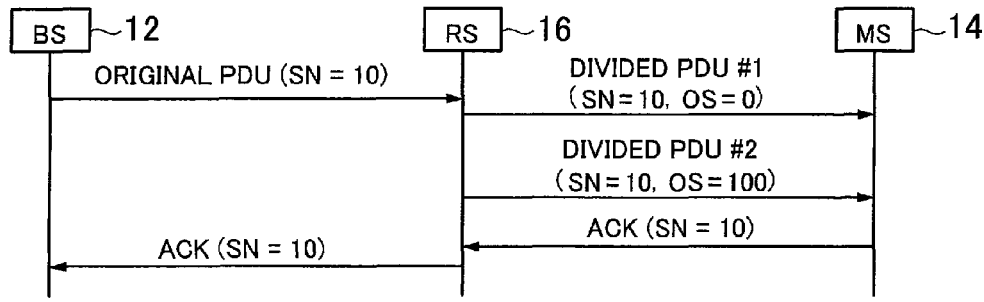
FIGS. 11A, 11B and 11C each exemplify an overall flow of ARQ process executed in the packet communication system illustrated in FIG. 1.

FIG. 11A exemplifies an overall flow of the ARQ process executed in the packet communication system 10 including the BS 12, the RS 16 and the MS 14.

First, the fifth communicator 68 of the BS 12 transmits an original PDU with a 200-byte SDU to the RS 16. The SN of the original PDU transmitted is assumed to be "10". The first communicator 18 of the RS 16 receives the original PDU.

The PDU length determiner 28*a* (see FIG. 2) of the RS 16, which has the transmittable data amount D set therein in accordance with the wireless channel condition, compares the transmission size of the PDU with the data amount D. If it is found as a result that the transmission size of the PDU is larger than the data amount D and also if the transmittable data amount for SDU is restricted to 100 bytes, the divided PDU generator 28*d* generates a divided PDU #1 with a 100-byte SDU. The second communicator 20 of the RS 16 transmits the divided PDU #1 to the MS 14. The divided PDU #1 transmitted at this time is affixed with the SN "10" and offset information OS "0". The offset information OS "0" indicates that the dividing position is the beginning of the undivided original SDU, that is, the beginning of the divided SDU coincides with the beginning of the original SDU.

Likewise, the divided PDU generator 28*d* generates a divided PDU #2 with a 100-byte SDU. The second communicator 20 of the RS 16 transmits the divided PDU #2 to the MS 14. The divided PDU #2 transmitted at this time is affixed with the SN "10" and offset information OS "100". The offset information OS "100" indicates that the dividing position is between the 99th and 100th bytes of the undivided original SDU. That is to say, the data of the divided PDU #2 starts from the 100th byte of the SDU. Also, since the divided PDU #2 is the last divided PDU generated last by dividing the original PDU, specific information indicative of the end of the PDU is affixed to the divided PDU #2.

On the other hand, the third communicator 38 of the MS 14 receives the divided PDUs #1 and #2 one after the other. At the MS 14, the ARQ reception controller 42 (see FIG. 5) determines whether or not the undivided original SDU has been normally received in its entirety by normally receiving the divided PDUs #1 and #2. In the example illustrated in FIG. 11A, it is judged that the original SDU has been normally received in its entirety by the MS 14. Accordingly, the controller 48 of the MS 14 generates an ACK (hereinafter referred to as ACK (SN=10)) including the SN "10", and the fourth communicator 40 of the MS 14 transmits the ACK (SN=10) to the RS 16.

The first communicator 18 of the RS 16 receives the ACK (SN=10) transmitted from the MS 14, and the second communicator 20 transmits the ACK (SN=10) to the BS 12.

The sixth communicator 70 of the BS 12 receives the ACK (SN=10), and the ACK extractor 74 (see FIG. 8) extracts the ACK (SN=10) and sends the extracted ACK (SN=10) to the controller 78. In accordance with the ACK (SN=10), the controller 78 instructs the ARQ transmission controller 66 to cause the ARQ buffer 66b to discard the original PDU with the SN "10" stored therein. Consequently, the ARQ buffer 66b discards the original PDU with the SN "10".

Where a NAK (SN=10) is transmitted from the MS 14 to the BS 12 via the RS 16, the BS 12 transmits the original PDU with the SN "10" to the MS 14 via the RS 16. Accordingly, after the NAK (SN=10) is transmitted to the BS 12, the first communicator 18 of the RS 16 again receives the original PDU with the SN "10" from the BS 12.

(Embodiment 1: Overall Flow 2 of ARQ Process)

Figure 11B:
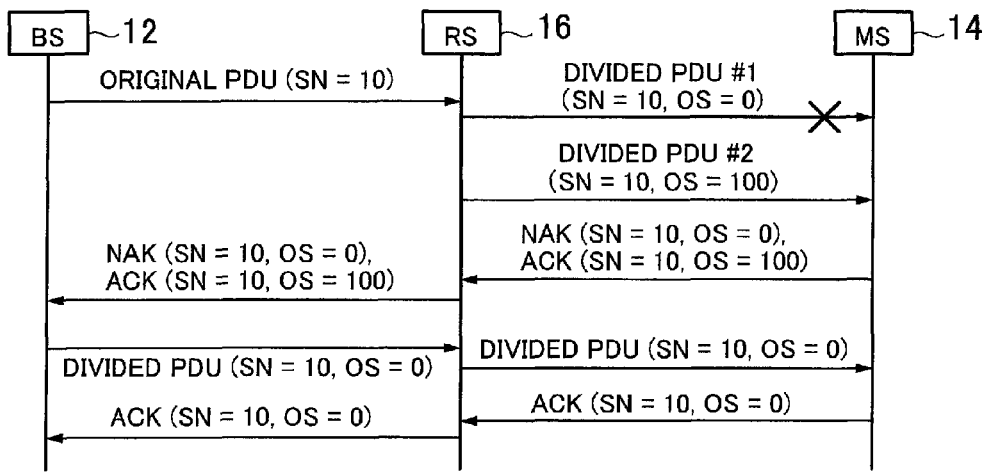

FIG. 11B illustrates another exemplary overall flow of the ARQ process.

Specifically, FIG. 11B exemplifies the case where the MS 14 normally receives the divided PDU #2 but fails to receive the divided PDU #1 within the predetermined time. The following explanation also applies to the case where the divided PDU #1 was received but as a result of the CRC (Cyclic Redundancy Check), it was found that the divided PDU #1 was not normally received.

The ARQ reception controller 42 (see FIG. 5) of the MS 14 determines whether or not the divided PDUs #1 and #2 have been normally received. In the example illustrated in FIG. 11B, it is judged that the MS 14 failed to normally receive the divided PDU #1 with the offset information OS "0". Accordingly, the controller 48 of the MS 14 generates a NAK with respect to the divided PDU #1 and an ACK with respect to the divided PDU #2. The MS 14 transmits the ACK and the NAK by means of the fourth communicator 40 to the RS 16. The NAK includes the SN "10" of the original PDU and the offset information OS "0", and the ACK includes the SN "10" of the original PDU and the offset information OS "100". In the following, the NAK and the ACK will be referred to as NAK (SN=10, OS=0) and ACK (SN=10, OS=100), respectively.

At the RS 16, the first communicator 18 receives the NAK (SN=10,OS=0) and ACK (SN=10, OS=100) transmitted from the MS 14, and the second communicator 20 transmits the NAK (SN=10, OS=0) and the ACK (SN=10, OS=100) to the BS 12.

At the BS 12, the ACK extractor 74 (see FIG. 8) extracts the NAK (SN=10, OS=0) and the ACK (SN=10, OS=100), which are then sent to the controller 78. In accordance with the NAK (SN=10, OS=0), the controller 78 sends an instruction to the ARQ transmission controller 66. Following the instruction, the PDU generator 66a reads out the original PDU with the SN "10" stored in the ARQ buffer 66b, and extracts data from the beginning (0th byte) to the 99th byte of the original SDU in accordance with the offset information OS "0", to generate a divided PDU (SN=10, OS=0). At this time, the BS 12 is unable to conclude solely on the basis of the NAK (SN=10, OS=0) that up to the 99th byte of data has to be extracted, but can draw the conclusion from the offset amount OS "100" included in the ACK (SN=10, OS=100). In this manner, the BS 12 generates the divided PDU (SN=10, OS=0) that failed to be received, and the fifth communicator 68 transmits the divided PDU (SN=10, OS =0) to the RS 16. At the RS 16, the first communicator 18 receives the divided PDU (SN=10, OS=0) newly generated by the BS 12, and the second communicator 20 transmits the divided PDU (SN=10, OS=0) to the MS 14.

If the divided PDU (SN=10, OS=0) is normally received by the MS 14, the ARQ reception controller 42 generates an ACK (SN=10, OS=0), and the fourth communicator 40 transmits the ACK (SN=10, OS=0) to the RS 16. The RS 16 simply relays the received ACK (SN=10, OS=0) to the BS 12.

At the BS 12, the ACK extractor 74 (see FIG. 8) extracts the ACK (SN=10, OS=0) and sends same to the controller 78. Since the ACK (SN=10, OS=100) has already been received, the controller 78 instructs the ARQ transmission controller 66 to cause the ARQ buffer 66b to discard the original PDU with the SN "10" stored therein, in accordance with the received ACK (SN=10, OS=0). Consequently, the ARQ buffer 66b discards the original PDU with the SN "10".

(Embodiment 1: Overall Flow 3 of ARQ Process)

Figure 11C:
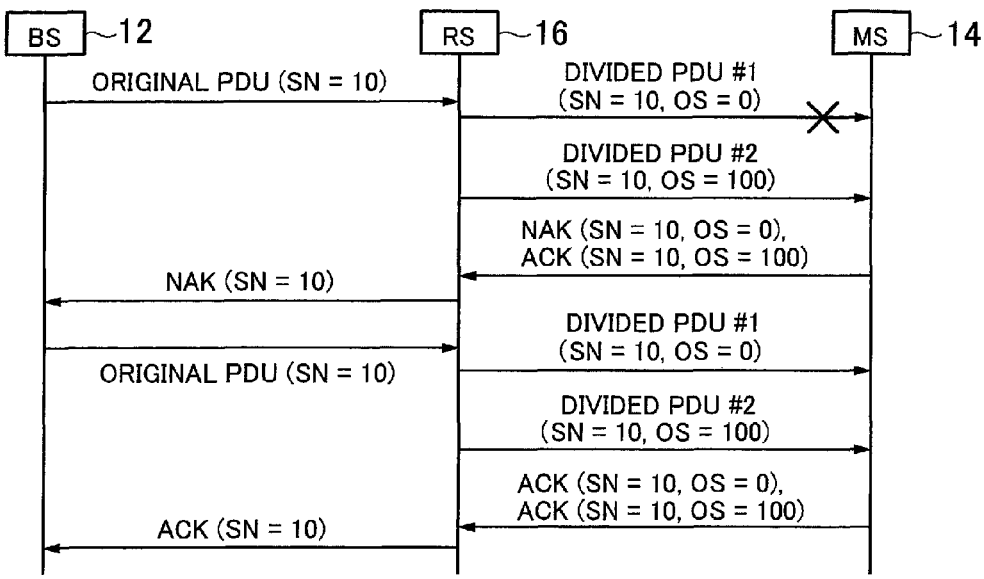

FIG. 11C illustrates still another exemplary overall flow of the ARQ process.

Specifically, FIG. 11C exemplifies the case where the MS 14 normally receives the divided PDU #2 but fails to receive the divided PDU #1, as in the case of FIG. 11B. The following explanation also applies to the case where the divided PDU #1 was received but as a result of the CRC (Cyclic Redundancy Check), it was found that the divided PDU #1 was not normally received.

At the MS 14, the ARQ reception controller 42 (see FIG. 5) determines based on the ACK or NAK of the divided PDUs #1 and #2 whether or not the reception of the original SDU has been completed. In the example illustrated in FIG. 11C, it is judged that the MS 14 failed to normally receive the divided PDU #1 with the offset information OS "0", as in the case illustrated in FIG. 11B. In this case, the controller 48 of the MS 14 generates a NAK (SN=10, OS=0) with respect to the divided PDU #1 and an ACK (SN=10, OS=100) with respect to the divided PDU #2. The fourth communicator 40 of the MS 14 transmits the ACK (SN=10, OS=100) and the NAK (SN=10, OS=0) to the RS 16.

The first communicator 18 of the RS 16 receives the ACK (SN=10, OS=100) and the NAK (SN=10, OS=0). Based on the received NAK (SN=10, OS=0) and ACK (SN=10, OS=100), the ACK manager 30 of the RS 16 judges that reception of the entire original SDU is not completed yet. Consequently, the ACK manager 30 generates a NAK (SN=10) indicating reception incompletion of the original PDU. The second communicator 20 of the RS 16 transmits the generated NAK (SN=10) to the BS 12. The NAK (SN=10) transmitted at this time does not include the offset information OS "0".

The sixth communicator of the BS 12 receives the NAK (SN=10). Then, the ARQ transmission controller 66 reads out the original PDU with the SN "10" from the ARQ buffer 66b, and the fifth communicator 68 transmits the original PDU with the SN "10" to the RS 16.

The first communicator 18 of the RS 16 receives the original PDU with the SN "10". The PDU re-constructor 28 of the RS 16 generates divided PDUs #1 and #2, and the second communicator 20 transmits the divided PDUs #1 and #2 to the MS 14. If the MS 14 can normally receive the divided PDUs #1 and #2 thus transmitted, the MS 14 generates an ACK (SN=10, OS=0) and an ACK (SN=10, OS=100) and transmits the generated ACKs to the RS 16. The RS 16 judges based on the received ACK (SN=10, OS=0) and ACK (SN=10, OS=100) that the reception of the original SDU in its entirety has been completed. Accordingly, the RS 16 generates an ACK (SN=10) and transmits the generated ACK to the BS 12.

The ACK extractor 74 (see FIG. 8) of the BS 12 extracts the ACK (SN=10) and sends the extracted ACK to the controller 78. In accordance with the ACK (SN=10), the controller 78 instructs the ARQ transmission controller 66 to cause the ARQ buffer 66b to discard the original PDU with the SN "10" stored therein. Consequently, the ARQ buffer 66b discards the original PDU with the SN "10".

In this manner, the ARQ process is executed among the BS 12, the RS 16 and the MS 14 as illustrated in FIGS. 11A to 11C.

In all cases illustrated in FIGS. 11A to 11C, the RS 16 in the packet communication system 10 transmits divided PDUs each affixed with the packet number of the original PDU and the offset information, whereby the ARQ process can be smoothly carried out. If, however, the SN is renumbered without affixing the offset information to the divided PDU as illustrated in FIG. 12, inconsistency occurs in the ARQ status, causing an awkward situation where the ARQ process fails to be properly executed.

Figure 12:
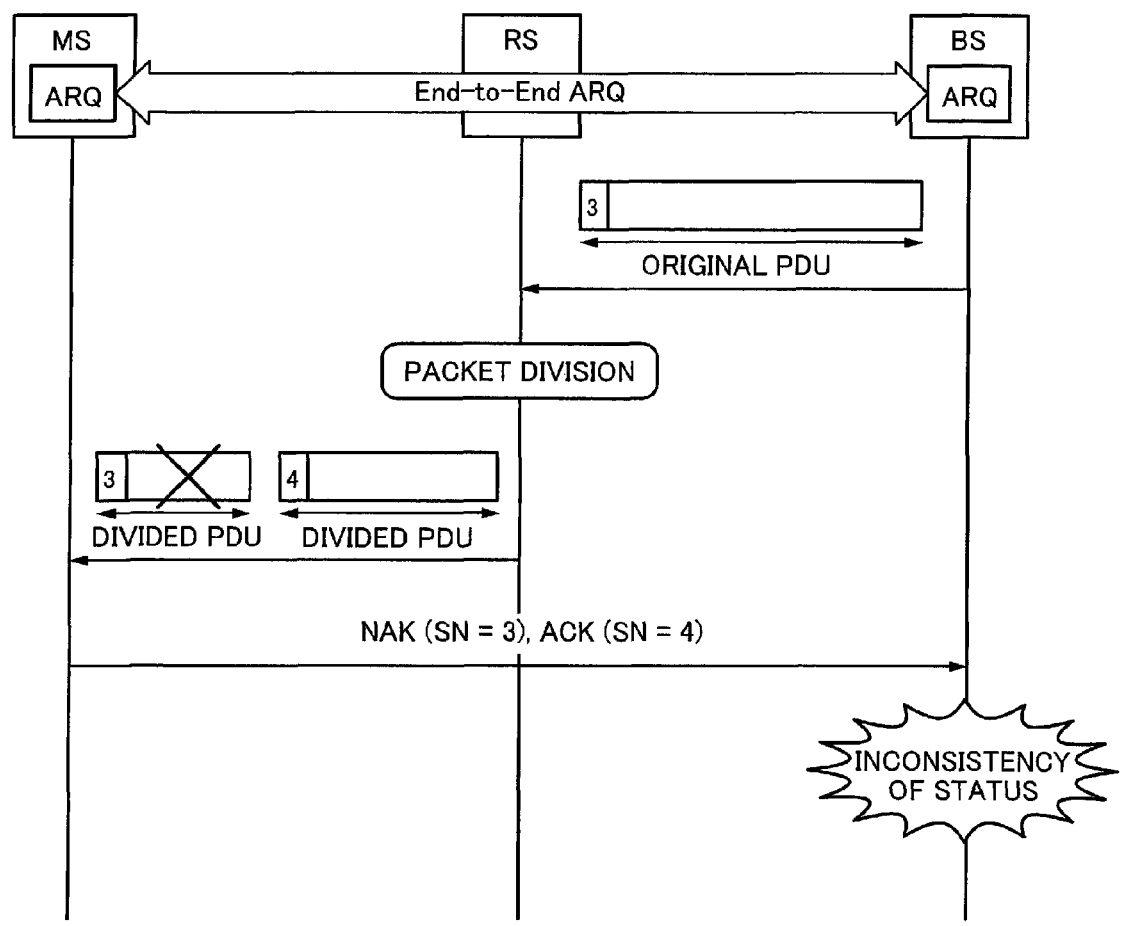
FIG. 12 is a diagram explaining a problem with the IEEE 802.16m encountered where Embodiment 1 is not adopted.

Specifically, as illustrated in FIG. 12, the BS transmits an original PDU with the SN "3", and the RS divides the original PDU with the SN "3" to generate divided PDUs with the SNs "3" and "4", respectively, and transmits the divided PDUs to the MS. If, in this case, the MS fails to normally receive the divided PDU with the SN "3" but can normally receive the divided PDU with the SN "4", the MS transmits a NAK (SN=3) and an ACK (SN=4) to the BS.

The BS receives the ACK (SN=4) even though a PDU with the SN "4" has not yet been transmitted from the BS. Consequently, the BS judges that the ARQ process is desynchronized, and resets the ARQ status between the BS and the MS.

In the packet communication system 10, on the other hand, the RS 16 transmits divided PDUs while including in each divided PDU the offset information indicative of the dividing position where the original SDU in the original PDU was divided. By using the offset information, therefore, it is possible to avoid inconsistency being caused in the ARQ status.

In the example illustrated in FIG. 11A, the MS 14, the RS 16 and the BS 12 can smoothly carry out the ARQ process by using the packet number and the offset information included in the ACK or NAK.

The BS 12 can determine with ease whether the original PDU needs to be retransmitted or not, and in accordance with the result of the determination, the BS 12 retransmits or discards the original PDU. The MS 14 determines whether the entire original SDU could be received or not by using the packet number and the offset information included in the ACK or NAK, and therefore, the determination can be made easily and quickly. That is to say, the packet communication system 10 can smoothly carry out the ARQ process.

In the example illustrated in FIG. 11B, the RS 16 transmits the ACK or NAK received from the MS 14 and including the packet number and the offset information, directly to the BS 12. Using the packet number and the offset information, therefore, the BS 12 can easily and quickly generate a divided PDU which failed to be received, and transmit the divided PDU to the MS 12. That is, the packet communication system 10 can smoothly carry out the ARQ process. Especially, since the BS 12 transmits a divided PDU smaller in data size than the original PDU, the radio resources can be efficiently used.

In the example illustrated in FIG. 11C, the RS 16 receives the ACK or NAK of a divided PDU from the MS 14. In this case, the RS 16 can quickly determine with ease whether the reception of the entire original SDU has been completed or not by using the ACK or NAK including the packet number and the offset information. Also, the BS 12 can determine without delay whether to discard or retransmit the original PDU in accordance with the received ACK or NAK. Namely, the packet communication system 10 can smoothly execute the ARQ process.

(Embodiment 2)

Figure 13:
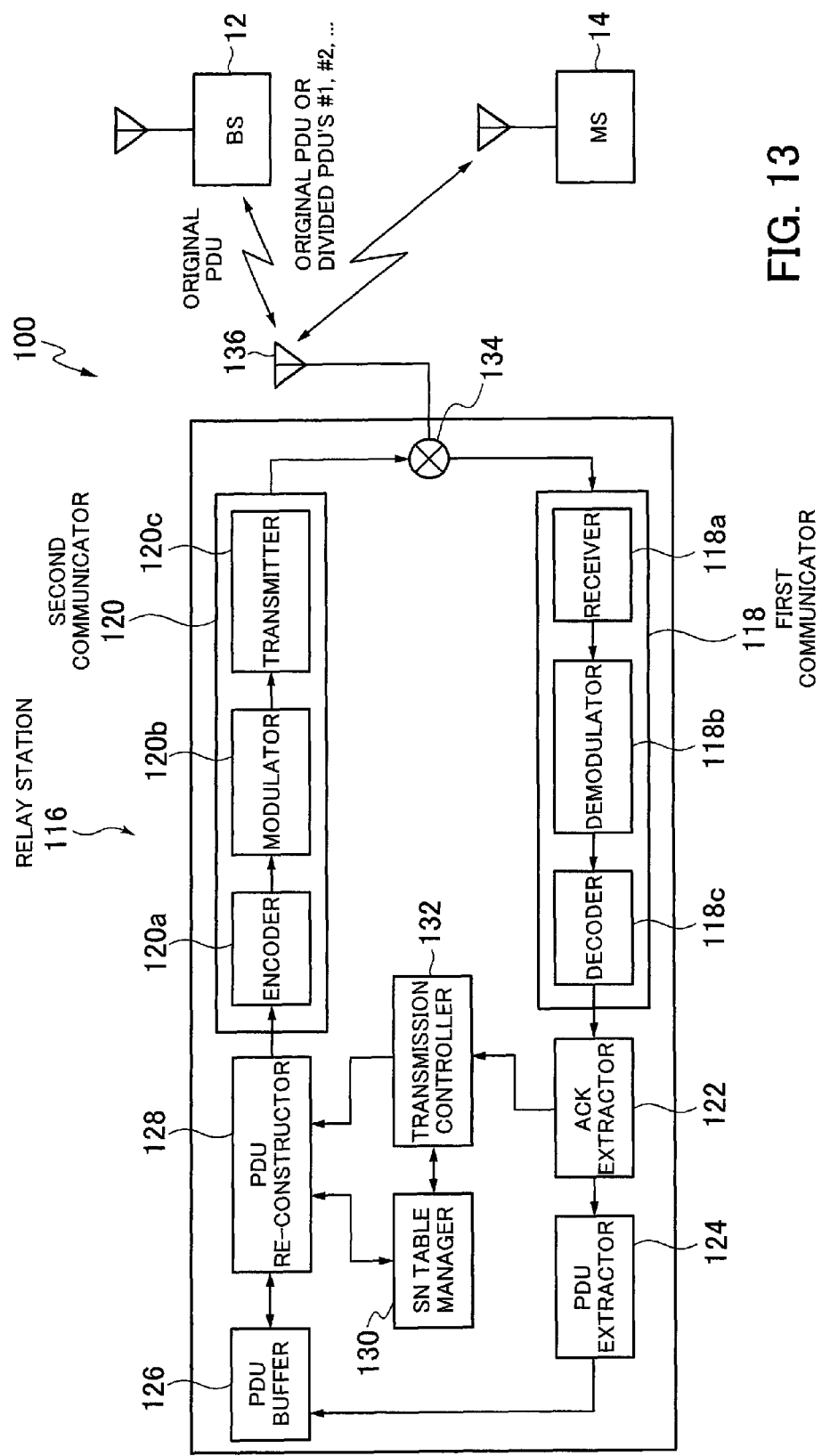
FIG. 13 is a block diagram of a packet communication system according to Embodiment 2.

FIG. 13 is a block diagram of a packet communication system 100 according to Embodiment 2. The packet communication system 100 illustrated in FIG. 13 includes a BS (wireless base station) 12, an MS (wireless terminal device 14), and an RS (relay station) 116 for relaying transmission packets communicated between the BS 12 and the MS 14. The MS 14 communicates with the BS 12 via the RS 116. In the case of downlink communication, the BS 12 acts as transmitting station and the MS 14 acts as receiving station. The MS 14 and the BS 12 can, however, be transmitting and receiving stations, respectively, as the case may be. In the following, explanation will be made with reference to the case of downlink communication where the BS 12 and the MS 14 act as transmitting and receiving stations, respectively.

(Embodiment 2: Configuration of Relay Station)

FIG. 13 illustrates a schematic configuration of the RS 116, which is a relay station.

When relaying the communication between the BS 12 and the MS 14, the RS 116 determines, with respect to each of original PDUs successively received from the BS 12, whether the original PDU needs to be divided or not in accordance with the wireless channel condition, and transmits, to the MS 14, divided PDUs or the original PDU itself without dividing the original PDU. That is, the RS 116 divides the original PDU on an optional basis. At this time, the RS 116 replaces the packet number (hereinafter referred to as original packet number), which is a sequence number included in the header information of the original PDU, with a different packet number (hereinafter referred to as new packet number), which is a new sequence number, regardless of whether divided PDUs are generated or not. The RS 116 includes the new packet number in the header information of the original PDU or divided PDUs to be transmitted, and transmits the original PDU or divided PDUs to the MS 14.

The configuration of the RS 116 will be now described in detail.

The RS 116 includes a first communicator 118, a second communicator 120, an ACK extractor 122, a PDU extractor 124, a PDU buffer 126, a PDU re-constructor 128, an SN table manager 130, a transmission controller 132, a duplexer 134, and a transmitting-and-receiving antenna 136.

The first communicator 118 receives an original PDU transmitted from the BS 12 and having an original packet number included in the header information thereof, and also receives an ACK or NAK from the MS 14. More specifically, the first communicator 118 includes a receiver 118a, a demodulator 118b, and a decoder 118c. The ACK is reception completion information indicating that the reception of an original PDU has been completed, or reception acknowledgement information indicating that a divided PDU has been normally received. The NAK is reception incompletion information indicating that the reception of the original PDU is not completed yet, or non-acknowledgement information indicating that the divided PDU failed to be normally received.

The receiver 118a performs a wireless reception process on the received signal received by the transmitting-and-receiving antenna 136 and input to the duplexer 134, the wireless reception process including amplification with the use of a low-noise amplifier, frequency conversion (down-conversion) to the baseband frequency, and AD conversion.

Using a demodulation scheme matching the modulation scheme used by the BS 12 or the MS 14, the demodulator 118*b* demodulates the received signal which has been subjected to the wireless reception process at the receiver 118*a*.

The decoder 118*c* decodes the received signal demodulated by the demodulator 118*b*, by using a scheme and a rate matching the encoding scheme and rate used by the BS 12 or the MS 14.

The second communicator 120, on the other hand, transmits the divided PDU or original PDU received from the PDU re-constructor 128 and having a new packet number included in the header information thereof to the MS 14, and also transmits, to the BS 12, the ACK or NAK received from the MS 14. More specifically, the second communicator 120 includes an encoder 120*a*, a modulator 120*b*, and a transmitter 120*c*.

The encoder 120*a* applies an error correction code, such as turbo code, to the divided PDU or original PDU received from the PDU re-constructor 128 or to the ACK or NAK.

Using a modulation scheme such as QPSK or 16QAM, the modulator 120*b* modulates the encoded data received from the encoder 120*a*.

The transmitter 120*c* performs a wireless transmission process on the modulated signal received from the modulator 120*b*, to generate a transmit signal. The wireless transmission process includes DA conversion, frequency conversion (up-conversion) to radio frequency (RF), and amplification up to predetermined transmission power with the use of a high-power amplifier.

The duplexer 134 isolates the transmit signal and the received signal from each other. Specifically, the duplexer 134 outputs the transmit signal, received from the transmitter 120*c*, to the transmitting-and-receiving antenna 136, and also outputs the received signal from the transmitting-and-receiving antenna 136 to the receiver 118*a*.

The transmitting-and-receiving antenna 136 radiates the transmit signal, received from the duplexer 134, into the air toward the MS 14 or the BS 12, and also receives the signal radiated into the air from the MS 14 or the BS 12.

The ACK extractor 122 extracts the ACK or NAK including a new packet number from the decoded data received from the decoder 118*c*. The extracted ACK or NAK is sent to the transmission controller 132.

The PDU extractor 124 extracts the original PDU from the decoded data received from the decoder 118*c*. At this time, the PDU extractor 124 performs CRC on the original PDU to determine whether or not the original PDU has been normally received.

The PDU buffer 126 temporarily stores the original PDU until the PDU is read out by the PDU re-constructor 128.

The PDU re-constructor 128 reads out the original PDU stored in the PDU buffer 126 and generates divided SDUs by dividing the original SDU in the read original PDU in accordance with the wireless channel condition, to generate divided PDUs. When the wireless channel condition is good, the original PDU read out is of course not divided. Further, the PDU re-constructor 128 modifies the header information by replacing the original packet number included in the header information with a new packet number different from the original packet number. The PDU re-constructor 128 affixes the modified header information to the divided SDU or original SDU and thereby reconstructs the original PDU.

Figures 14A, 14B:
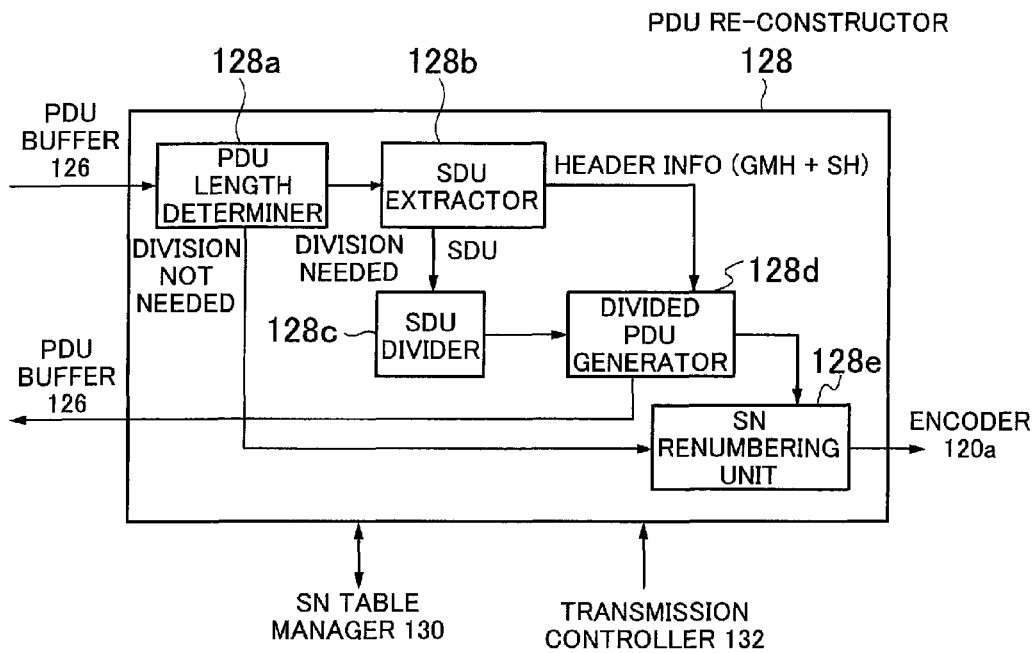
FIG. 14A is a block diagram illustrating details of a PDU re-constructor in a relay station illustrated in FIG. 13.
FIG. 14B illustrates an exemplary correspondence table held and managed by an SN table manager in the relay station illustrated in FIG. 13.

As illustrated in FIG. 14A, the PDU re-constructor 128 includes a PDU length determiner 128*a*, an SDU extractor 128*b*, an SDU divider 128*c*, a divided PDU generator 128*d*, and an SN renumbering unit 128*e*.

The PDU length determiner 128*a* reads out a PDU from the PDU buffer 126 in accordance with PDU transmission timing instructed by the transmission controller 132, and determines based on a transmittable data amount D specified by the transmission controller 132 whether to divide the PDU for transmission or not. The PDU stored in the PDU buffer 126 is an original PDU or a divided PDU generated by dividing an original PDU and waiting to be transmitted. The transmittable data amount D is determined in accordance with the condition of the wireless channel between the RS 116 and the MS 14 and the amount of available radio resources.

The size of the divided PDU generated for transmission may be determined as an integer multiple of a previously set size. Where the size of the divided PDU is defined as an integer multiple of the set size, the BS 12, the MS 14 and the RS 116 are preferably made to share the set size by making use of signaling or the like at the time of setting up a connection among the BS 12, the MS 14 and the RS 116 prior to the start of packet communication. By determining the set size, it is possible to make it easier for the BS 12, the MS 14 and the RS 116 to control and manage data.

If it is judged that the PDU need not be divided, the PDU length determiner 128*a* sends the read PDU to the SN renumbering unit 128*e*. On the other hand, if it is judged that the PDU needs to be divided, the PDU length determiner 128*a* sends the PDU to the SDU extractor 128*b*.

The SDU extractor 128*b* separates the received PDU into the header information, which includes a GMH (Generic MAC Header) and an SH (extended Sub Header), and the SDU, which is the data stored in the payload, and sends the separated SDU to the SDU divider 128*c*. The header information is sent to the divided PDU generator 128*d*.

The SDU divider 128*c* divides the SDU received from the SDU extractor 128*b*. In this case, the SDU divider 128*c* divides the SDU so that the data amount of each divided SDU may not be larger than a data amount equal to the difference between the aforementioned transmittable data amount D, specified by the transmission controller 132, and the size of the header information. The divided SDU thus generated is sent to the divided PDU generator 128*d*.

The divided PDU generator 128*d* affixes the header information received from the SDU extractor 128*b* to the divided SDU received from the SDU divider 128*c*, to generate a divided PDU.

The divided PDU generator 128*d* sends the divided PDU generated thereby to the SN renumbering unit 128*e*.

The SN renumbering unit 128*e* modifies the header information by replacing the original packet number, which is included in the header information of the divided PDU received from the divided PDU generator 128*d* or in the header information of the PDU received from the PDU length determiner 128*a*, with a new packet number different from the original packet number.

For example, where divided PDUs #1 and #2 are successively generated by dividing an original PDU having the original packet number SN "6" included in its header information, the SN renumbering unit 128*e* replaces the original packet number SN "6" included in the header information of the divided PDU #1, with a new packet number, for example, the SN "31", and sends the divided PDU #1 to the encoder 120*a*. Further, the SN renumbering unit 128*e* replaces the original packet number SN "6" included in the header information of the divided PDU #2 sent thereto, with a new packet number, for example, the SN "32". When an original PDU having the original packet number SN "7" included in its header information is thereafter received by the RS 116 and if the PDU length determiner 128*a* judges that this original PDU need not be divided, the SN renumbering unit 128e replaces the original packet number SN "7" included in the header information of the original PDU with a new packet number, for example, the SN "33". The new packet number to replace the original packet number is consecutively assigned in such a manner that an original PDU with a smaller original packet number is assigned a smaller new packet number and also that, with respect to divided PDUs generated from an identical PDU, a divided PDU generated earlier is assigned a smaller new packet number.

In the process of replacing the original packet numbers with respective new consecutive packet numbers by the SN renumbering unit 128e, a situation can arise where the new packet number to replace a certain original packet number is identical with the original packet number.

The transmission controller 132 controls the generation of divided PDUs by the PDU re-constructor 128 and also determines the transmittable data amount in accordance with the wireless channel condition. The transmittable data amount is determined by the available radio resources (number of sub-channels, number of symbols), the modulation scheme and the code rate.

Also, the transmission controller 132 determines the transmission timing so that a scheduler provided in the RS 116 can guarantee QoS (Quality of Service), and controls the transmission in accordance with the determined timing. Alternatively, the transmission controller 132 may control the transmission in accordance with the transmission timing determined by the BS 12. The transmission controller 132 provides the PDU re-constructor 128 with a trigger signal for transmission, to initiate the generation of divided PDUs to be transmitted.

Further, using the ACK or NAK received from the MS 14 and indicating the reception acknowledgement or non-acknowledgement of a divided PDU, the transmission controller 132 determines whether the reception of the entire original SDU by the MS 14 has been completed or not. In accordance with the result of the determination, the transmission controller 132 generates an ACK or NAK of the original PDU and sends the generated ACK or NAK to the encoder 120a via the PDU re-constructor 128. For example, the transmission controller 132 generates an ACK or NAK indicating whether all of the SDU including the original packet number SN "6", for example, in the header information has been completely received or not by means of the divided PDUs #1 and #2, and sends the generated ACK or NAK to the encoder 120a via the PDU re-constructor 128.

The SN table manager 130 holds and manages a correspondence table indicating the correspondence relationships between the original packet numbers and the respective new packet numbers. In the above instance, the original packet number SN "6" is associated with the new packet number SN "31" as well as with the new packet number SN "32", and the original packet number SN "7" is associated with the new packet number SN "33".

FIG. 14B illustrates an example of the correspondence table. When an ACK or NAK including the new packet number is received from the MS 14, the transmission controller 132 looks up the correspondence table to identify the original packet number of the original PDU which the MS 14 has completely or incompletely received. Thus, the RS 116 generates an ACK or NAK including the original packet number and transmits the generated ACK or NAK to the BS 12.

The BS 12 receives the ACK or NAK transmitted from the RS 116, whereupon the BS 12 can learn whether the reception of the entire original SDU by the MS 14 has been completed or not.

(Embodiment 2: Flow of PDU Reconstruction)

The following describes a flow of the PDU reconstruction executed in the RS 116. The PDU reconstruction means replacing the original packet number included in the header information of an original PDU or divided PDU with a new packet number different from the original packet number and affixing the new packet number to the original SDU or divided SDU.

Figure 15:
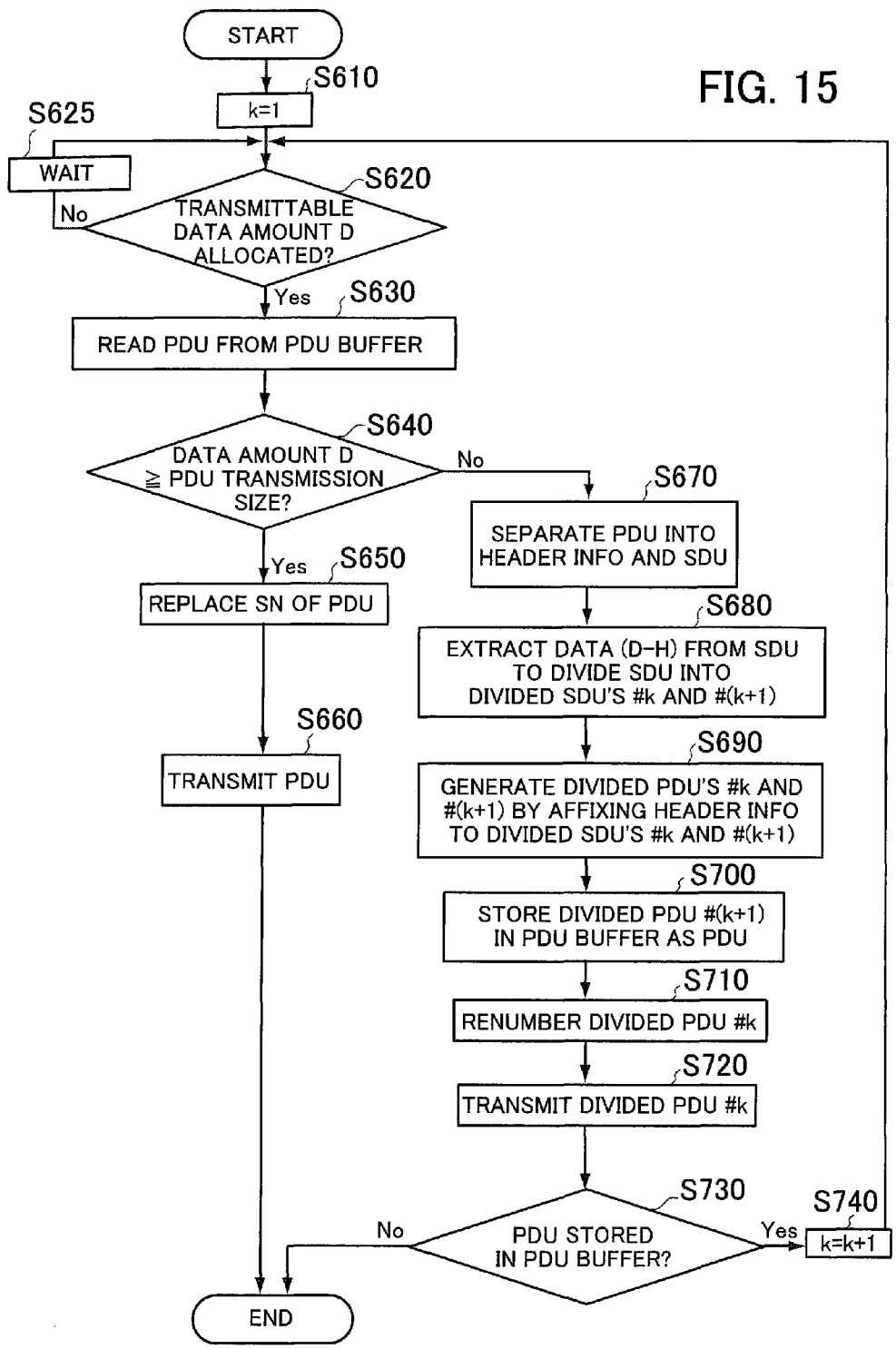
FIG. 15 is a flowchart illustrating an exemplary flow of PDU reconstruction executed in the relay station illustrated in FIG. 13.

FIG. 15 illustrates an exemplary flow of such PDU reconstruction.

First, the PDU length determiner 128a sets a counter k to "1" (Step S610) and then determines whether the transmittable data amount D for packet transmission has been allocated or not (Step S620). The transmittable data amount D is allocated variably in accordance with the wireless channel condition.

If no transmittable data amount D has been allocated, the RS 116 remains in a transmission waiting state until the transmittable data amount D is allocated (Step S625).

On the other hand, if it is judged in Step S620 that the transmittable data amount D has been allocated, the PDU length determiner 128a reads out the original PDU with a corresponding original packet number from the PDU buffer 126 (Step S630), and compares the transmission size of the original PDU with the transmittable data amount D (Step S640). If it is judged as a result of the comparison that the transmission size of the PDU is equal to or smaller than the transmittable data amount D, the PDU length determiner 128a concludes that the PDU need not be divided, and sends the original PDU to the SN renumbering unit 128e. The SN renumbering unit 128e replaces the original packet number included in the header information of the original PDU received from the PDU length determiner 128a with a new packet number (Step S650) and sends the resulting PDU to the encoder 120a. Consequently, the original PDU which has been transmitted from the BS 12 is reconstructed by replacing the original packet number included in the header information thereof with the new packet number, and then transmitted to the MS 14 without being divided (Step S660).

If it is found as a result of the comparison in Step S640 that the transmission size of the original PDU is larger than the data amount D, the PDU length determiner 128a judges that the original PDU needs to be divided, and sends the original PDU to the SDU extractor 128b.

The SDU extractor 128b first separates the original PDU into the header information and the original SDU (Step S670). The header information includes a GMH and an SH, and the packet number is included in the SH.

Subsequently, the SDU extractor 128b sends the separated original SDU to the SDU divider 128c, and sends the header information to the divided PDU generator 128d.

The SDU divider 128c extracts part of the data from the beginning of the original SDU in an amount corresponding to a data amount (D-H) which is obtained by subtracting a data amount H of the header information from the transmittable data amount D. The extracted data is handled as a divided SDU #k, and the remaining data as a divided SDU #(k+1). In this manner, the original SDU is divided into the divided SDUs #k and #(k+1) (Step S680). The SDU divider 128c sends the divided SDUs #k and #(k+1) to the divided PDU generator 128d.

The divided PDU generator 128d affixes the header information received from the SDU extractor 128b and including the original packet number, to each of the divided SDUs #k and #(k+1) received from the SDU divider 128c, to generate divided PDUs #k and #(k+1) (Step S690). Where the divided PDU #(k+1) is not generated, the divided PDU #k is the last divided PDU. In this case, therefore, the divided PDU generator 128*d* affixes specific information to the divided PDU #k so that the last divided PDU can be identified.

Then, the divided PDU generator 128*d* sends the divided PDU #(k+1) to the PDU buffer 126, which stores the divided PDU #(k+1) as a PDU (Step S700). Also, the divided PDU generator 128*d* sends the divided PDU #k to the SN renumbering unit 128*e*.

In accordance with instructions from the transmission controller 132, the SN renumbering unit 128*e* replaces the original packet number, which is included in the header information of the original PDU received from the PDU length determiner 128*a* or in the header information of the divided PDU #k received from the divided PDU generator 128*d*, with a new packet sequence number SN (Step S710). The SN renumbering unit 128*e* sends the original packet number replaced and the new packet number to the SN table manager 130. The SN table manager 130 stores the correspondence between the original packet number and the new packet number in the correspondence table for management.

Then, the SN renumbering unit 128*e* sends the divided PDU #k affixed with the new packet number to the encoder 120*a*. As a result, the divided PDU #k is transmitted from the RS 116 (Step S720).

Further, at the subsequent instructed time for transmission, the transmission controller 132 determines whether or not the PDU buffer 126 has a PDU stored therein (Step S730). If there is no PDU stored in the PDU buffer 126, the PDU transmission ends. On the other hand, if the PDU buffer 126 has a PDU stored therein, k is incremented by "1" (Step S740), and the PDU reconstruction process returns to Step S620.

In this manner, a PDU or divided PDU is successively generated and transmitted until a decision is made in Step S730 that there is no stored PDU.

As stated above, the PDU or divided PDU, such as the divided PDUs #1, #2, . . . , has the new packet number, and not the original packet number, included in its header information, and the RS 116 holds and manages the correspondence table indicating the correspondence between the original packet number and the new packet number. Thus, when the RS 116 receives an ACK or NAK including the new packet number from the MS 14 during the ARQ process, the transmission controller 132 looks up the correspondence table held and managed by the SN table manager 130 and generates an ACK or NAK with the corresponding original packet number so that the generated ACK or NAK may be transmitted to the BS 12.

(Embodiment 2: Configuration of Transmitting Station)

The BS 12, which acts as transmitting station in Embodiment 2, transmits original PDUs and also retransmits an original PDU in response to the NAK received from the MS 14 as a result of the ARQ process. The BS 12 includes, as illustrated in FIG. 8, the network interface 60, the packet identification unit 62, the packet buffer 64, the ARQ transmission controller 66, the fifth communicator 68, the sixth communicator 70, the control message extractor 72, the ACK extractor 74, the packet reproducer 76, the duplexer 82, and the transmitting-and-receiving antenna 84. Since the functions of these elements are already explained above, description of the elements is omitted.

(Embodiment 2: Configuration of Receiving Station)

The MS 14 of Embodiment 2 receives the original PDU or divided PDUs successively transmitted from the RS 116, and also transmits an ACK or NAK of the original PDU or divided PDU. Since the new packet number is included in the header information of the received original PDU or divided PDU, the MS 14 can transmit an ACK or NAK of the original PDU or divided PDU by using the new packet number.

Specifically, the MS 14 includes, as illustrated in FIG. 5, the third communicator 38, the fourth communicator 40, the ARQ reception controller 42, the data processor 44, the PDU buffer 46, the controller 48, the duplexer 50, and the transmitting-and-receiving antenna 52. The functions of the third communicator 38, fourth communicator 40, data processor 44, PDU buffer 46, duplexer 50 and transmitting-and-receiving antenna are already explained above, and therefore, description of these elements is omitted.

The ARQ reception controller 42 determines, with respect to each new packet number sent from the RS 116, whether or not the MS 14 has normally received the corresponding PDU or divided PDU, and sends the result of the determination to the controller 48. In accordance with the received determination result, the controller 48 generates an ACK or NAK with respect to each new packet number, and sends the generated ACK or NAK to the fourth communicator 40. As a result, the ACK or NAK is transmitted from the MS 14 to the RS 116.

(Embodiment 2: Overall Flow of ARQ Process)

Figure 16:
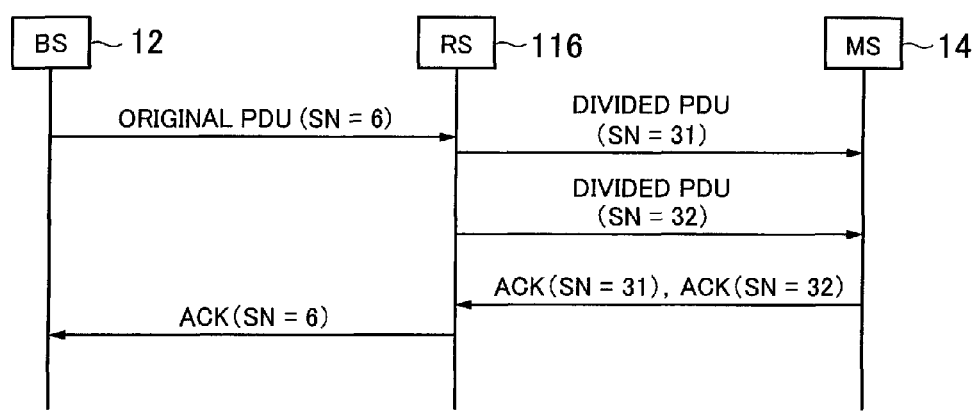
FIG. 16 exemplifies an overall flow of ARQ process executed in the packet communication system illustrated in FIG. 13.
Figure 17:
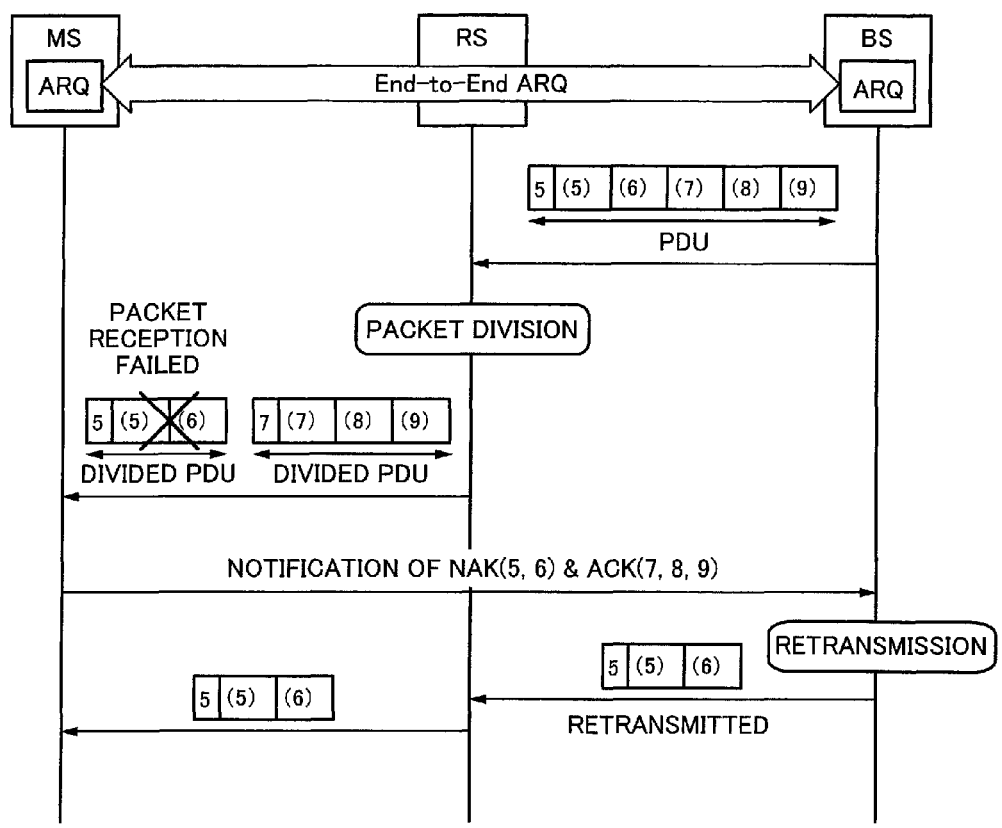
FIG. 17 is a diagram explaining an exemplary flow of automatic repeat request control according to the IEEE 802.16j.

FIG. 16 exemplifies an overall flow of the ARQ process according to Embodiment 2.

First, the BS 12 transmits a PDU with a 200-byte original SDU. The SN of the original PDU transmitted is assumed to be "6". The RS 116 receives the original PDU. The PDU length determiner 128*a* (see FIG. 14A) of the RS 116, which has the transmittable data amount D set therein in accordance with the wireless channel condition, compares the transmission size of the original PDU with the transmittable data amount D. If it is found as a result that the transmission size of the original PDU is larger than the transmittable data amount D and also if the data amount for SDU is restricted to 100 bytes, the divided PDU generator 128*d* generates a divided PDU #1 with a 100-byte divided SDU. At this time, the original packet number SN "6" is included in the header information of the divided PDU #1, and the SN renumbering unit 128*e* replaces the original packet number SN "6" with the new packet number SN "31". Subsequently, the RS 116 transmits the divided PDU #1 to the MS 14 by using the second communicator 120.

Likewise, the divided PDU generator 128*d* generates a divided PDU #2 with a 100-byte divided SDU. At this time, the original packet number SN "6" is included in the header information of the divided PDU #2, and the SN renumbering unit 128*e* replaces the original packet number SN "6" with the new packet number SN "32". Then, the RS 116 transmits the divided PDU #2 to the MS 14 via the second communicator 120.

On the other hand, the MS 14 receives the divided PDUs #1 and #2 one after the other. The ARQ reception controller 42 (see FIG. 5) of the MS 14 determines whether or not the divided PDUs #1 and #2 have been normally received. In the example illustrated in FIG. 16, it is judged that both of the divided PDUs #1 and #2 have been normally received by the MS 14. Accordingly, the controller 48 of the MS 14 generates an ACK (SN=31) and an ACK (SN=32). Then, using the fourth communicator 40, the MS 14 transmits the generated ACK (SN=31) and ACK (SN=32) to the RS 116.

The first communicator 118 of the RS 116 receives the ACK (SN=31) and ACK (SN=32) transmitted from the MS 14. Looking up the correspondence table of the SN table manager 130, the RS 116 retrieves the original packet number SN "6". In this case, since the ACK has been returned with respect to both the new packet numbers SN "31" and SN "32" corresponding to the original packet number SN "6", the transmission controller 132 generates an ACK (SN=6). The second communicator 120 then transmits the ACK (SN=6) to the BS 12.

At the BS 12, the ACK extractor 74 (see FIG. 8) extracts the ACK (SN=6) and sends the extracted ACK (SN=6) to the controller 78. In accordance with the ACK (SN=6), the controller 78 instructs the ARQ transmission controller 66 to cause the ARQ buffer 66b to discard the original PDU with the SN "6" stored therein. Consequently, the ARQ buffer 66b discards the original PDU with the SN "6".

In the above instance, both of the divided PDUs #1 and #2 are normally received. Where the first communicator 118 of the RS 116 has received a NAK with respect to at least one of the divided PDUs with the new packet numbers SN "31" and SN "32", the transmission controller 132 generates a NAK (SN=6), and the second communicator 120 transmits the NAK (SN=6) to the BS 12. For example, where the divided PDU #1 failed to be normally received and the divided PDU #2 has been normally received, that is, if the RS 116 receives a NAK (SN=31) and an ACK (SN=32) from the MS 14, the RS 116 generates a NAK (SN=6) because the reception of the entire original SDU transmitted from the BS 12 is not yet completed, and transmits the generated NAK (SN=6) to the BS 12.

In this manner, the communication of the original PDU or divided PDUs, and the ACK or NAK between the RS 116 and the MS is executed using the new packet numbers, while the communication of the PDU or divided PDUs, and the ACK or NAK between the RS 116 and the BS 12 is executed using the original packet numbers. The RS 116 is provided with the correspondence table indicating the correspondence between the original and new packet numbers and converts the original packet number to the new packet number and vice versa, whereby the ARQ process between the BS 12 and the MS 14 can be smoothly relayed. That is, the packet communication system 100 can smoothly carry out the ARQ process.

Also, the BS 12 and the MS 14 need not be additionally equipped with a new extended function for the ARQ process relayed via the RS 116.

With the above relay station, receiving station, transmitting station and packet communication system, ARQ processing can be smoothly executed when packets of variable block size are transmitted. Further, since communication using divided packets of variable block size as well as the ARQ process can be executed, it is possible to make efficient use of radio resources.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A relay station for relaying transmission packets between a transmitting station and a receiving station, comprising:
    a first communicator configured to receive a transmission packet transmitted from the transmitting station and affixed with a packet number;
    a packet re-constructor configured to generate a divided data unit by dividing data included in the received transmission packet, and generate a divided packet including the divided data unit affixed with the packet number and dividing position information indicating a position where the data in the transmission packet was divided to generate the divided data unit;
    a second communicator configured to transmit the generated divided packet to the receiving station; and
    a reception acknowledgement manager configured to determine whether or not the receiving station could receive all of the data in the transmission packet,
    wherein:
    the first communicator receives, from the receiving station, reception acknowledgement or non-acknowledgement information indicating reception acknowledgement or non-acknowledgement of the divided packet and including the packet number and the dividing position information, the reception acknowledgement or non-acknowledgement information indicating success or failure in reception of the divided packet identified by the packet number and the dividing position information,
    the reception acknowledgement manager makes a determination as to whether or not the receiving station could receive all of the data in the transmission packet, by using the packet number and the dividing position information included in the reception acknowledgement or non-acknowledgement information,
    the second communicator transmits, to the transmitting station, reception completion or incompletion information indicating completion or incompletion of reception of all of the data in the transmission packet by the receiving station, in accordance with a result of the determination by the reception acknowledgement manager, and
    the second communicator transmits the reception completion information to the transmitting station when the receiving station receives all divided packets, and transmits the incompletion information to the transmitting station when the receiving station receives a part of all divided packets.

2. The relay station according to claim 1, wherein:
    the packet re-constructor successively generates a plurality of divided packets from the transmission packet,
    the second communicator successively transmits the plurality of divided packets to the receiving station, and
    the reception acknowledgement manager makes the determination by using the reception acknowledgement or non-acknowledgement information received with respect to each of the plurality of divided packets.

3. The relay station according to claim 1, wherein:
    the first communicator receives, from the receiving station, reception acknowledgement or non-acknowledgement information indicating reception acknowledgement or non-acknowledgement of the divided packet and including the packet number and the dividing position information, the reception acknowledgement or non-acknowledgement information indicating success or failure in reception of the divided packet identified by the packet number and the dividing position information, and
    the second communicator transmits the reception acknowledgement or non-acknowledgement information to the transmitting station.

4. The relay station according to claim 3, wherein, after the non-acknowledgement information is transmitted as the reception acknowledgement or non-acknowledgement information from the second communicator to the transmitting station, the first communicator receives, from the transmitting station, a new transmission packet including part of the data of the transmission packet specified by the dividing position information.

5. The relay station according to claim 1, wherein:
the first communicator receives, from the receiving station, reception completion or incompletion information including the packet number and indicating whether or not the receiving station has received all of the data in the transmission packet by means of a plurality of divided packets, and
the second communicator transmits the reception completion or incompletion information to the transmitting station.

6. The relay station according to claim 5, wherein, after the reception incompletion information is transmitted as the reception completion or incompletion information from the second communicator to the transmitting station, the first communicator again receives the transmission packet from the transmitting station.

7. The relay station according to any one of claims 1 to 6, wherein the divided packet has a size equal to an integer multiple of a previously set size.

8. A relay station for relaying transmission packets between a transmitting station and a receiving station, comprising:
a first communicator configured to receive a transmission packet transmitted from the transmitting station and affixed with a first packet number, and further receive information from the receiving station;
a packet re-constructor configured to generate a divided data unit by dividing data included in the received transmission packet, and generate a reconstructed packet by replacing the first packet number with a second packet number identical with or different from the first packet number and affixing the second packet number to the divided data unit;
a table manager configured to manage a correspondence table indicating correspondence relationship between the first and second packet numbers;
a second communicator configured to transmit the reconstructed packet to the receiving station; and
a transmission controller configured to operate, when reception acknowledgement or non-acknowledgement information including the second packet number and indicating whether the receiving station could receive the reconstructed packet or not is received from the receiving station by the first communicator, to determine whether the receiving station could receive all of the data in the transmission packet by means of the reconstructed packet or not by using the correspondence table and the second packet number included in the reception acknowledgement or non-acknowledgement information about the reconstructed packet.

9. The relay station according to claim 8, wherein the packet re-constructor determines based on a size of the data in the transmission packet whether to divide the data in the transmission packet, and if it is judged as a result of determination that the data in the received transmission packet need not be divided, the packet re-constructor generates the reconstructed packet by replacing the first packet number with the second packet number and affixing the second packet number to the data in the transmission packet.

10. The relay station according to claim 8, wherein:
if it is judged by the transmission controller that the receiving station could receive all of the data in the transmission packet, the second communicator transmits, to the transmitting station, reception completion information including the first packet number and indicating completion of reception of the transmission packet, and
if it is judged by the transmission controller that the receiving station could not receive all of the data in the transmission packet, the second communicator transmits, to the transmitting station, reception incompletion information including the first packet number of the transmission packet and indicating incompletion of reception of the transmission packet.

11. A receiving station for receiving, via a relay station, data of a transmission packet transmitted from a transmitting station, comprising:
a third communicator configured to receive a divided packet which includes a divided data unit obtained by dividing the data in the transmission packet at the relay station and which is affixed with a packet number of the transmission packet and dividing position information indicating a position where the data in the transmission packet was divided to obtain the divided data unit;
a reception controller configured to determine whether all of the data in the transmission packet has been received or not by using the packet number of the received divided packet and the dividing position information; and
a fourth communicator, wherein:
if it is judged by the reception controller that all of the data in the transmission packet could be received, the fourth communicator transmits, to the relay station, reception completion information including the packet number and indicating completion of reception of the transmission packet, and
if it is judged by the reception controller that all of the data in the transmission packet could not be received, the fourth communicator transmits, to the relay station, reception incompletion information including the packet number and indicating incompletion of reception of the transmission packet.

* * * * *